US006734334B2

(12) United States Patent
Chekhmir et al.

(10) Patent No.: US 6,734,334 B2
(45) Date of Patent: May 11, 2004

(54) PROCESSES FOR IMMOBILIZING RADIOACTIVE AND HAZARDOUS WASTES

(75) Inventors: Anatoly Chekhmir, Ma'aleh Adumim (IL); Arthur Gribetz, Jerusalem (IL)

(73) Assignee: Geomatrix Solutions, Inc., New York, NY (US)

( * ) Notice: Subject to any disclaimer, the term of this patent is extended or adjusted under 35 U.S.C. 154(b) by 228 days.

(21) Appl. No.: 09/810,557

(22) Filed: Mar. 19, 2001

(65) Prior Publication Data

US 2002/0038070 A1 Mar. 28, 2002

(51) Int. Cl.$^7$ .............................. G21F 1/00; G21F 9/16; A62D 3/00
(52) U.S. Cl. ................................ 588/2; 588/4; 588/16; 588/252; 252/625
(58) Field of Search ........................... 588/3, 4, 10, 11, 588/14, 16, 252, 253, 257, 2, 9; 252/625, 635; 210/682

(56) References Cited

U.S. PATENT DOCUMENTS

| | | | | |
|---|---|---|---|---|
| 3,959,172 A | * | 5/1976 | Brownell et al. | 405/129.25 |
| 4,297,304 A | * | 10/1981 | Scheffler et al. | 264/333 |
| 4,464,294 A | * | 8/1984 | Thiele | 588/11 |
| 4,534,893 A | * | 8/1985 | Dippel et al. | 264/0.5 |
| 4,632,778 A | | 12/1986 | Lehto et al. | |
| 5,256,338 A | | 10/1993 | Nishi et al. | |
| 5,750,824 A | | 5/1998 | Day | |
| 5,771,472 A | * | 6/1998 | Carpena et al. | 252/625 |
| 5,882,581 A | | 3/1999 | Gotovchikov et al. | |
| 5,926,771 A | | 7/1999 | Brown | |
| 5,926,772 A | | 7/1999 | Kalb et al. | |
| 5,947,887 A | | 9/1999 | White et al. | |
| 5,960,368 A | | 9/1999 | Pierce et al. | |
| 5,994,609 A | | 11/1999 | Luo | |
| 6,023,006 A | | 2/2000 | Fiquet et al. | |
| 6,258,994 B1 | | 7/2001 | Jantzen et al. | |

FOREIGN PATENT DOCUMENTS

| | | | |
|---|---|---|---|
| EP | 0043397 A1 | * | 1/1982 |
| WO | WO 97/19034 | | 5/1997 |
| WO | WO 97-19034 | * | 5/1997 |

OTHER PUBLICATIONS

PCT Written Opinion, PCT/US01/18786, Jun. 12, 2001.
Epelbaum, M.B; Simakin, A.G.; Dikov, Yu.P.; Pal, A.A. "Zonality of Crystal is One More Possible Barrier to Migration of Radionuclides." Geological Problems of Radioative Waste Burial. Contribution of Physical–Chemical Petrology. vol. 18 (no month 1994), p.126–138.
Anatoly S. Chekhmir and Mark B. Epel'Baum, "Diffusion in Magmatic Melts: New Study," Found in Chapter 3, Physical Chemistry of Magmas pp. 99–119, Editors: Leonid L. Perchuk, Ikuo Kushiro, 1991.

* cited by examiner

Primary Examiner—Steven Bos
Assistant Examiner—Anthony Kuhar
(74) Attorney, Agent, or Firm—Shaw Pittman LLP

(57) ABSTRACT

The present invention utilizes one or more processes to immobilize a waste that contains one or more of radionuclides, hazardous elements, hazardous compounds, and/or other compounds present in the waste. Each of the processes create a barrier against leaching and diffusion of the wastes. The first barrier is created by integrating the waste with an immobilizing mineral. The second barrier is a layer of non-radioactive or non-hazardous material that covers the first barrier. The second barrier may be created using an overgrowth procedure or by sintering. The third barrier is created by a rock or glass matrix that surrounds the first and/or second barriers. The fourth barrier is created by ensuring that the rock or glass has the same or similar composition as the indigenous rock at the disposal site. The resultant rock or glass matrix is in equilibrium with the groundwater or local hydrothermal solutions that are saturated with components of the indigenous rock of the disposal area.

48 Claims, 11 Drawing Sheets

(1 of 11 Drawing Sheet(s) Filed in Color)

Zeolite - plagioclase transformation and covering

Accelerating Voltage: 15 KeV  
Resolution: 1024 x 1024  
Magnification: 350  
Pixel Size: 0.23726 microns

PROCESSES FOR IMMOBILIZING RADIOACTIVE AND HAZARDOUS WASTES

This application claims the benefits of Israeli Patent Application Ser. No. IL 136,685, filed Jun. 12, 2000.

BACKGROUND

1. Field of the Invention

The present invention relates generally to treatment of radioactive and hazardous wastes, and more particularly to processes for immobilizing a waste containing one or more of radionuclides, hazardous elements, hazardous compounds, and other compounds present in the waste.

2. Background of the Invention

The use of radioactive and hazardous materials in the world has led to the accumulation of a significant amount of radioactive and hazardous wastes. There is an international consensus regarding the planned disposal of these wastes by burying them in the ground in deep geological repositories. At the present time, high-level radioactive wastes are being placed in long-term storage awaiting permanent disposal. Once buried, with the passage of time, groundwater and hydrothermal solutions can make contact with the radionuclides, hazardous elements, or hazardous compounds contained in the wastes. As a result, groundwater and hydrothermal solutions can facilitate the leaching of radionuclides, hazardous elements, and hazardous compounds out of the wastes into the biosphere in which plants and animals live. In addition, even without the interference from groundwater and hydrothermal solutions, radionuclides, hazardous elements, or hazardous compounds could possibly diffuse out of the wastes, resulting in contamination of the biosphere. Therefore, improper containment of the wastes can create a significant problem.

There are a number of existing processes that can potentially reduce the leaching and/or diffusion of radioactive and hazardous wastes. The existing processes, however, have various disadvantages. For example, cementation is commonly used to immobilize low-level and intermediate-level radioactive waste. This process is undesirable because a large volume of cement is required to immobilize a small quantity of wastes. Furthermore, cement is highly susceptible to both leaching and diffusion.

The most common method of handling high-level radioactive wastes is the vitrification in borosilicate glass. This process, however, has at least the following limitations. First, the vitrification creates a relatively weak bond between the radionuclides and the components of the glass. Second, the vitrification process distributes the radionuclides throughout the entire volume of the glass matrix rather than containing the radionuclides in a more concentrated manner. Vitrification is currently being used in a number of countries including France, the United States of America, Korea, Italy, Germany, the United Kingdom, Japan, Belgium, China, and Russia.

SUMMARY OF THE INVENTION

The present invention comprises one or more waste processing stages to immobilize wastes which contain radionuclides, hazardous elements, hazardous compounds, and/or other compounds such as waste oxides that are present in the waste. Each of the waste processing stages creates a barrier that immobilizes the waste. The preferred embodiment of the present invention creates a stable thermodynamic system comprising a number of physicochemical barriers. Each of these barriers decreases leaching and diffusion of radioactive and hazardous materials into the environment.

The first barrier is created by integrating the radionuclides, hazardous elements, hazardous compounds, and/or other compounds found in the waste with immobilizing minerals. Integration of the waste with the immobilizing minerals can be performed using one of several methods, including activation-absorption-transformation, synthesis, and solid state reaction. The product of each of these methods is hereinafter referred to as a waste integrated mineral or the first barrier. The process of creating this first barrier results in a loading of radionuclides, hazardous elements, hazardous compounds, and/or other compounds found in the waste that is two weight percent or greater. As shown in Example 1 described below, an immobilizing mineral can incorporate more than 75 weight % loading of thorium oxide. As shown in Example 5, loading of waste oxide can be as high as 100% weight.

The invention preferably includes a second barrier which is an effective covering comprising a layer of non-radioactive and non-hazardous material that covers the first barrier. The second barrier has a mineral composition that is the same as or similar to the immobilizing minerals of the first barrier. There are at least two ways to create the second barrier. First, the second barrier can be obtained by an overgrowth procedure that yields a crystalline material upon the surface of the first barrier. The thickness of the overgrowth is at least two microns, preferably at least 50 microns. Second, the second barrier can be obtained by sintering that yields a polycrystalline covering over the first barrier. The second barrier by sintering is at least several millimeters thick. Due to the high temperature caused by (i) the incorporation of radioactive materials into the immobilizing minerals, and (ii) the geothermal gradient, the second barrier will grow continuously (albeit at a slow rate) even after burial at the disposal site, thereby increasing the safety of the second barrier.

The invention preferably includes a third barrier, which is a surrounding matrix comprising either rock or glass that encapsulates the second barrier. Additional waste containing radionuclides, hazardous elements, hazardous compounds, and/or other compounds present in the waste can be mixed with the rock or glass, thus increasing the total amount of waste that is immobilized. In embodiments in which the second barrier is not present, the third barrier surrounds the first barrier. The rock or glass utilized to create the third barrier preferably contains some of the same components as the immobilizing minerals so that the immobilizing minerals can be in equilibrium with the rock or glass. The equilibrium state adds to the strength of the third barrier since the components of the immobilizing minerals will not readily diffuse to the surrounding matrix.

In addition to being barriers against leaching, these three barriers can effectively reduce the diffusion of the radionuclides and the hazardous elements or compounds to a negligible level.

The radioactive and hazardous wastes can be further immobilized by ensuring that the surrounding matrix comprising one of rock and glass either has a composition that is the same as or similar to the composition of the indigenous rock at the disposal site. It is preferable that the rock or glass has at least one component that is in common with components of the indigenous rock. In this case, the surrounding matrix will be in equilibrium with the groundwater or local hydrothermal solutions at the disposal site when the groundwater or local hydrothermal solutions are saturated with components of the indigenous rock. The rates of leaching or diffusion of radionuclides and hazardous elements or compounds out of the surrounding matrix are negligible in the equilibrium state. In effect, the equilibrium state can be considered as a fourth barrier against leaching and diffusion.

BRIEF DESCRIPTION OF THE DRAWINGS

The file of this patent contains at least one drawing executed in color.

Copies of this patent with color drawing(s) will be provided by the Patent and Trademark Office upon request and payment of the necessary fee.

DETAILED DESCRIPTION OF THE INVENTION

Figure 1:
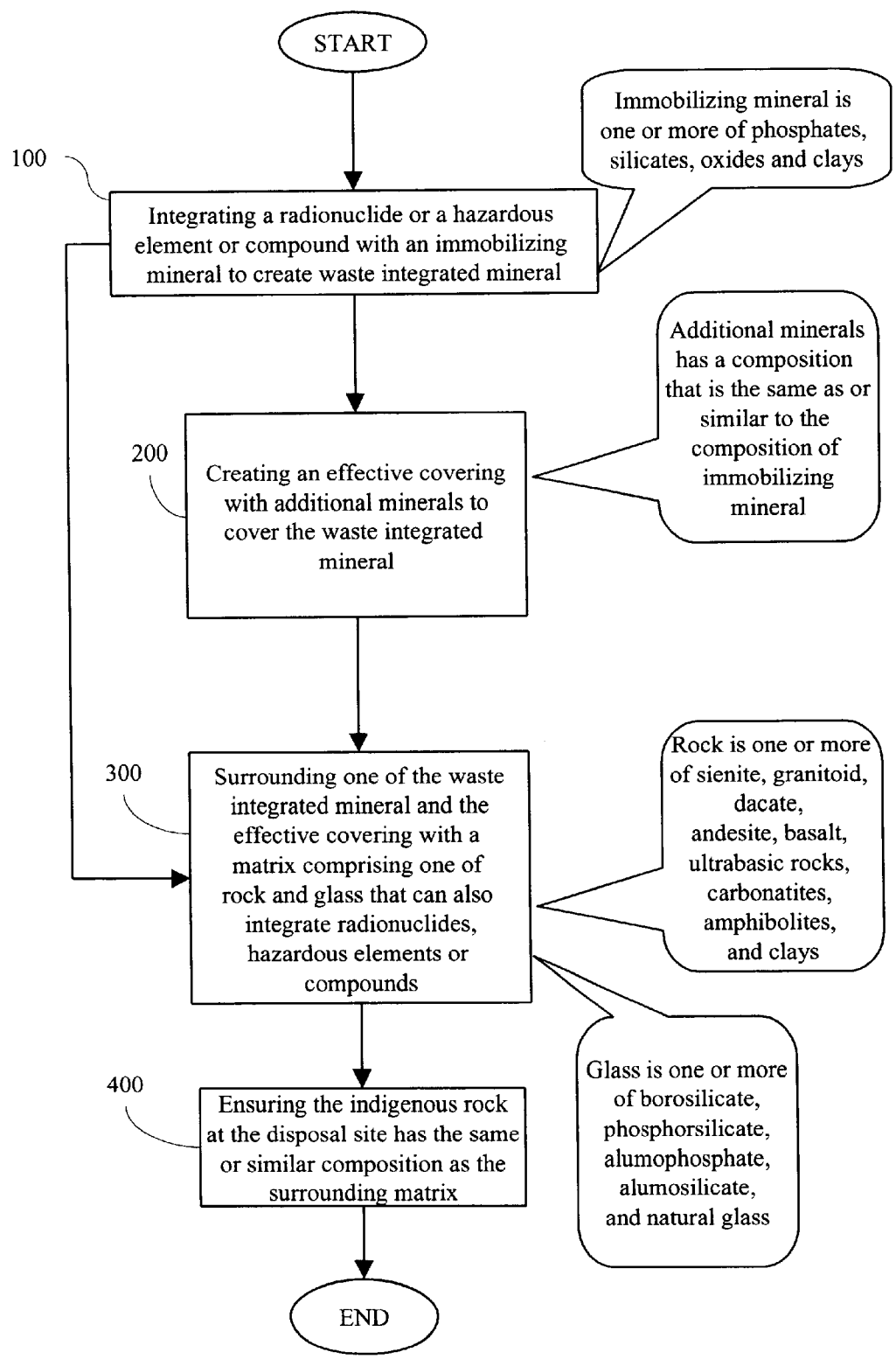
FIG. 1 is a flowchart showing an overview of the various stages involved in treating radioactive and hazardous wastes in accordance with a preferred embodiment of the present invention.

The term "waste" includes waste materials, such as fission products, which contain radionuclides, hazardous elements, hazardous compounds, and/or other components present in the waste. Waste mixtures can include, for example, the following elements and their compounds: Fe, Na, P, Cr, Al, Mn, Ni, Na, Zr, K, Cs, Ru, Sr, Ba, Tc, Rh, Mg, I, lanthanides, actinides, and their compounds (for example, Th, U, Pu, Np, Am, Cm, and Ce), and other components of radioactive and hazardous waste. Not all of these elements and their compounds, if separated, are hazardous.

Since many of the compounds of waste mixtures are oxides, the mixtures are commonly referred to as "waste oxides." The term "waste oxide loading" or "loading of waste oxide" refers to the weight percentage of the waste mixture (which is predominantly but not exclusively comprised of oxides and which can include non-hazardous components) in the final product of a waste immobilizing process.

The term "radionuclide" includes any nuclide that emits radiation, including one or more of alpha, beta, and gamma emissions. The term "nuclide" includes an atomic species in which all atoms have the same atomic number and mass number. However, processes in which mixtures of different radionuclides are immobilized are specifically included within the scope of the present invention. Examples of radionuclides are Sr and Cs, and actinides and lanthanides, such as thorium and uranium.

The term "element" used in the context of "hazardous element" includes an atomic element of the periodic table. The term "compound" used in the context of "hazardous compound" includes a substance composed of two or more elements.

There are three levels of radioactive wastes classified as follows:

1. Low-level radioactive wastes are generated primarily from hospitals, laboratories, and the industrial sector. Low-level radioactive wastes represent 90% by volume but only one percent by radioactivity of all radioactive wastes in the world.
2. Intermediate-level radioactive wastes comprise resins, chemical sludge, and nuclear reactor components. Intermediate-level radioactive wastes represent seven percent by volume and four percent by radioactivity of all radioactive wastes in the world.
3. High-level radioactive wastes comprise spent nuclear reactor fuel (spent fuel) and other high-level radioactive wastes generated principally from reprocessing the spent fuel. High-level radioactive wastes represent only three percent by volume but 95% by radioactivity of all radioactive wastes in the world.

Hazardous wastes (as defined in the EPA Environmental Glossary) are: Any waste or combination of wastes which pose a substantial present or potential hazard to human health or living organisms because such wastes are non-degradable or persistent in nature or because they can be biologically magnified, or because they can be lethal, or because they may otherwise cause or tend to cause detrimental cumulative effects.

The term "immobilizing mineral" includes a mineral with which radionuclides, hazardous elements, hazardous compounds, and/or other compounds present in the waste may be integrated. The immobilizing minerals may be, for example, one or more of phosphates, silicates, oxides, and clays, and mixtures of the foregoing. The immobilizing mineral can be naturally occurring or synthetic. The term "immobilizing mineral" as used herein also includes components of the immobilizing mineral.

Table 1 below, although not an all-inclusive list, provides examples of immobilizing minerals that may be used to integrate with the specific types of radioactive or hazardous elements listed. Many different immobilizing minerals may be selected to immobilize a particular type of waste. A suitable immobilizing mineral is one that produces isomorphic exchange with elements of the waste.

TABLE 1

Selection of Immobilizing Minerals

| Immobilizing Minerals | Radioactive or Hazardous Elements |
|---|---|
| Loparite | La, Ce, Pr, Nd, Sm, Eu, Gd, Nb, U, Th, Np, Pu, Am, Cm |
| Apatite | Y, La, Ce, Pr, Nd, Sm, Eu, Gd, U, Th, Np, Pu, Am, Cm |
| Sphen | Sr, Ba, Y, La, Ce, Pr, Nd, Sm, Eu, Gd, U, Th, Np, Pu, Am, Cm |

TABLE 1-continued

Selection of Immobilizing Minerals

| Immobilizing Minerals | Radioactive or Hazardous Elements |
|---|---|
| Feldspar, plagioclase | Na, K, Rb, Cs, Sr, Ba, Ge, Actinides, Lanthanides |
| Sodalite | Na, K, Rb, Cs, Ge, Br, I |
| Nepheline | Na, K, Rb, Cs, Ge |
| Thorite | Y, La, Ce, Pr, Nd, Sm, Eu, Gd, U |
| Zircon | Y, La, Ce, Pr, Nd, Sm, Eu, Gd, Zr |
| Monazite | Lanthanides, Actinides |
| Calcium-zeolite | Sr, Cs, Lanthanides, Actinides |

It is noted that each element listed in Table 1 can include one or more isotopes of the element. For example, element Cs can include Cs 134 and Cs 137.

Overview

FIG. 1 is a flowchart showing an overview of the various stages involved in treating radioactive and hazardous wastes in accordance with a preferred embodiment of the present invention. The preferred embodiment comprises four stages, namely, stages 100, 200, 300, and 400. The order of the various steps shown in the Figures is not necessarily critical to the invention. For example, where heating and mixing steps are shown, the mixing could be performed before, during and/or after heating.

Figure 2:
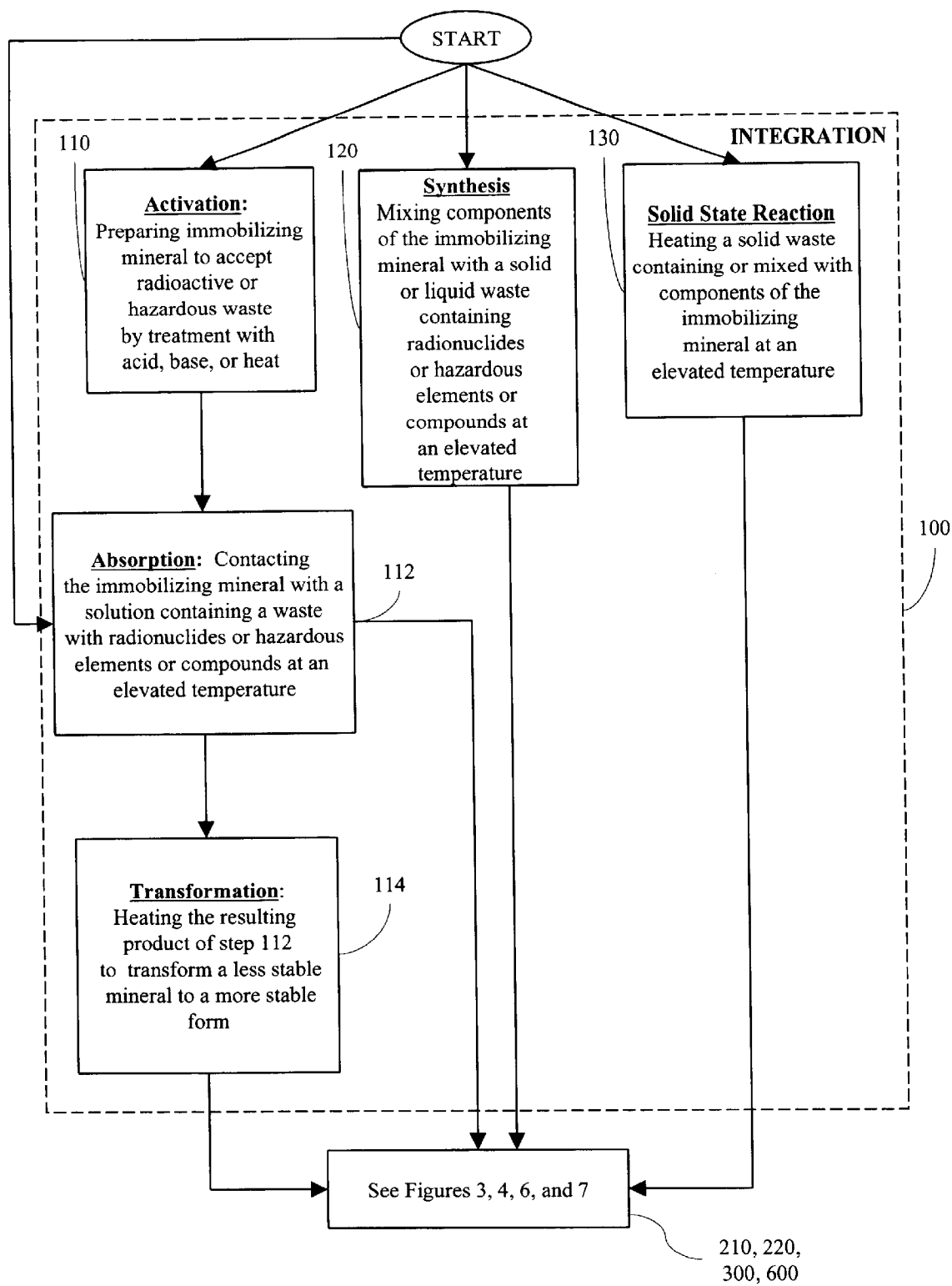
FIG. 2 is a flowchart showing alternative processes involved in integrating a waste with an immobilizing mineral to create a first barrier.

In stage 100, a waste comprising one or more of radionuclides, hazardous element, and hazardous compounds is integrated with an immobilizing mineral to create a first barrier (or waste integrated mineral). Integration can be performed using a number of different methods. For example, integration can be performed using an activation-absorption-transformation process, a synthesis, or a solid state reaction to create the first barrier. Alternative integration processes are shown in FIG. 2.

In Stage 200, the product of stage 100 (or an immobilizing mineral otherwise integrated with one or more of radionuclides, hazardous elements, and hazardous compounds) is covered with additional minerals having a composition that is the same as or similar to the composition of the immobilizing mineral to create a second barrier. The phrase "the same as or similar to" used in this context means close chemical composition and the same or similar crystalline structure. At least two alternative stages exist for stage 200. For example, in stage 210 shown in FIG. 3, the second barrier may be created by covering the first barrier with the additional mineral by an overgrowth procedure. The term "overgrowth procedure" refers to an overgrowth of crystalline material upon the surface of the immobilizing mineral.

Figure 4:
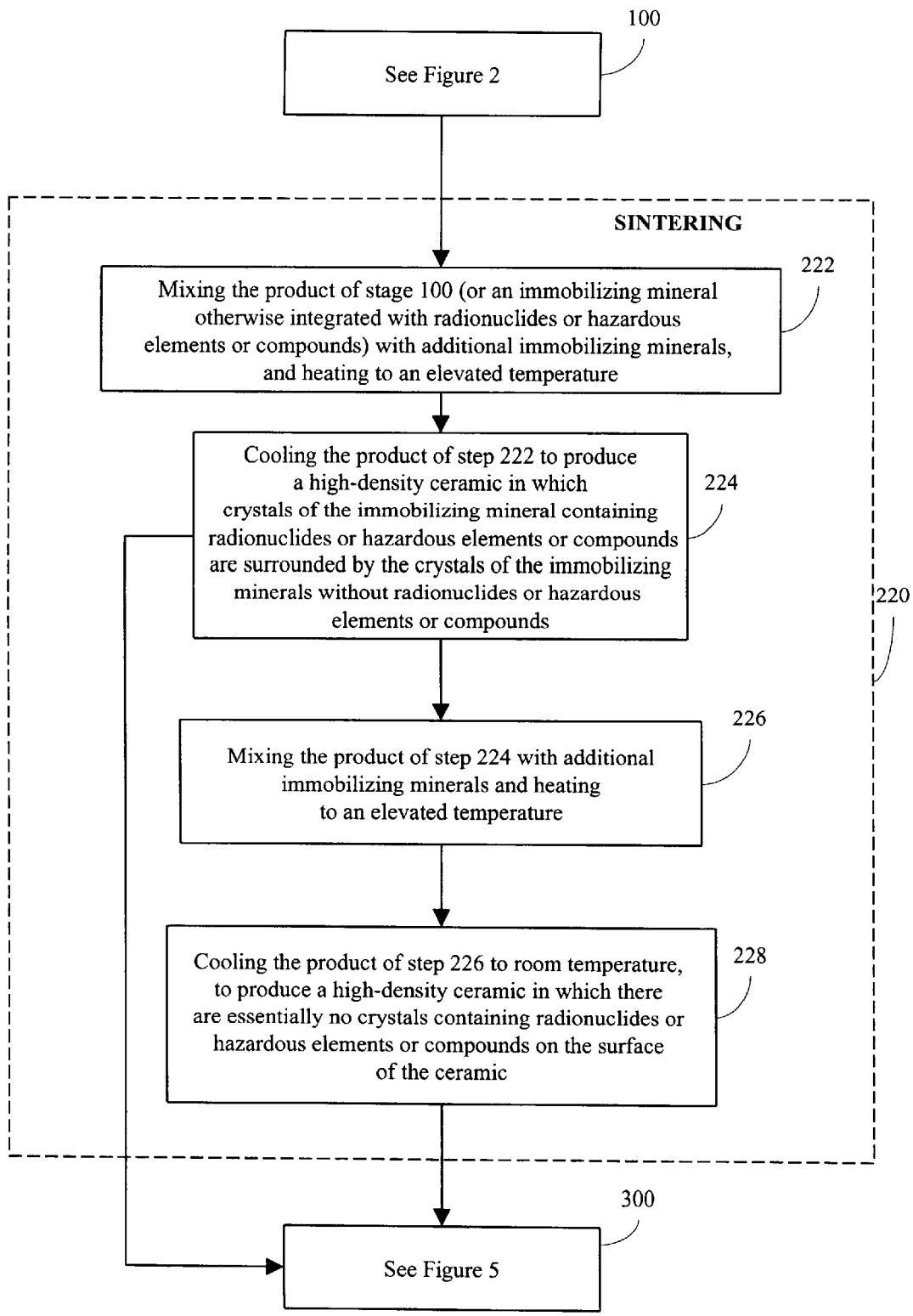
FIG. 4 is a flowchart showing alternative processes for creating a second barrier by sintering.

Alternatively, the second barrier may be created, in stage 220 shown in FIG. 4, by sintering the first barrier with more of the same immobilizing mineral. The term "sintering" refers to the thermal treatment of a powder or compact at a temperature below the melting point of the main constituent, for the purpose of increasing its strength by bonding together of the particles. Another alternative for creating the second barrier may be performed by sintering the first barrier with more of the same immobilizing mineral and further sintering the sintered material with more of the same mineral.

Figure 5:
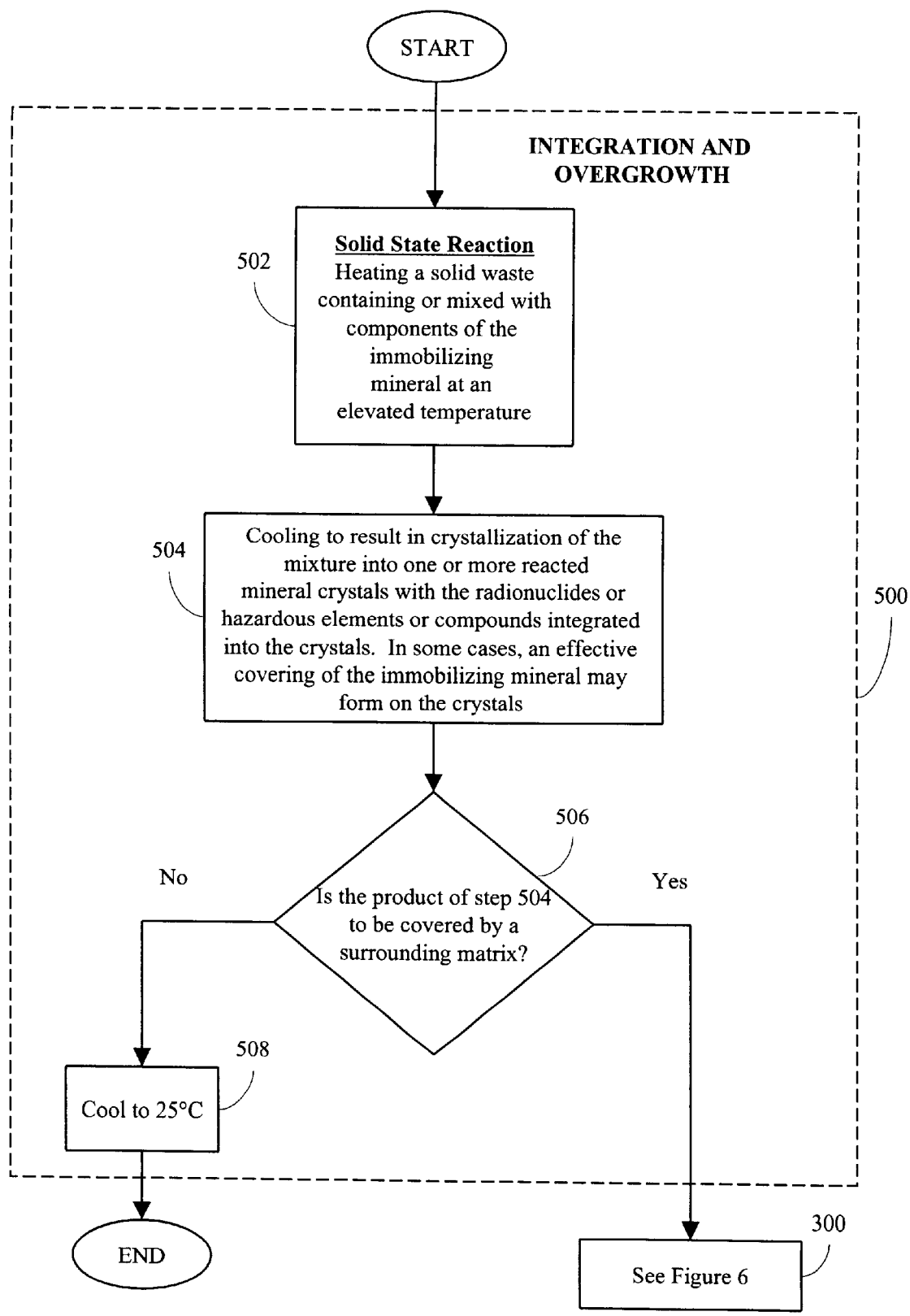
FIG. 5 is a flowchart showing the steps involved in creating the first and the second barriers in a single stage.

In preferred embodiments, processes of stages 100 and 200 may be combined to create the first and second barriers in a single stage. For example, stage 500 shown in FIG. 5 illustrates how an overgrowth (the second barrier) may be created over a waste integrated mineral (the first barrier) in a single stage.

In stage 300, the second barrier is covered with a surrounding matrix (the third barrier). The third barrier may be a rock matrix or a glass matrix. In embodiments in which the second barrier is not present, the first barrier is covered directly by the third barrier. Additional waste may be mixed with the glass or rock, thus increasing the total amount of waste that is immobilized. The rock or glass in the third barrier preferably contains components of the immobilizing mineral that is present in the first and/or second barrier. The term "components" used in the context of "components of the immobilizing mineral" includes one or more of different oxides, halides, hydroxides, and water associated with the immobilizing mineral. For example, the rock or glass can contain some of the same oxides which comprise the immobilizing mineral. For example, one immobilizing mineral that may be used in the present invention is monazite. The components of monazite include $Ce_2O_3$ and $P_2O_5$.

The rock may be, for example, one or more of sienite, granitoid, dacate, andesite, basalt, ultrabasic rocks, carbonatites, amphibolites, and clays. The glass may be, for example, one or more of borosilicate, phosphorosilicate, aluminophosphate, aluminosilicate, and naturally-occurring glass such as obsidian.

Specific examples of rock and their main forming minerals are shown in Table 2 below.

TABLE 2

Rocks and Their Forming Minerals

| Rocks | Forming Minerals |
|---|---|
| Granite | Plagioclase, feldspar, apatite, zircon, monazite, sphen, quartz, mica |
| Basalt | Feldspar, zircon, apatite, sphen, piroxene, plagioclase, olivine |
| Andesite | Feldspar, zircon, loparite, quartz, plagioclase |
| Ultrabasic | Olivine, piroxen, zircon, amphibole |

Table 3 below provides some examples of host rocks or rocks that may be used with specific types of immobilizing minerals.

TABLE 3

Selection of Host Rock and Forming Minerals
Which Can Be Used as Immobilizing Minerals

| Host Rock | Immobilizing Minerals |
|---|---|
| Alkaline rocks (sienite, urtite, nepheline-sienite) | Feldspars, plagioclase, nepheline, apatite, sodalite, loparite, sphen, monazite |
| Granitoids | Feldspars, plagioclase, monazite, zircon, apatite, sphen |
| Andesite | Feldspar, plagioclase, monazite, zircon, apatite, sphen |
| Basalts | Feldspar, plagioclase, zircon, apatite, sphen |

Figure 6:
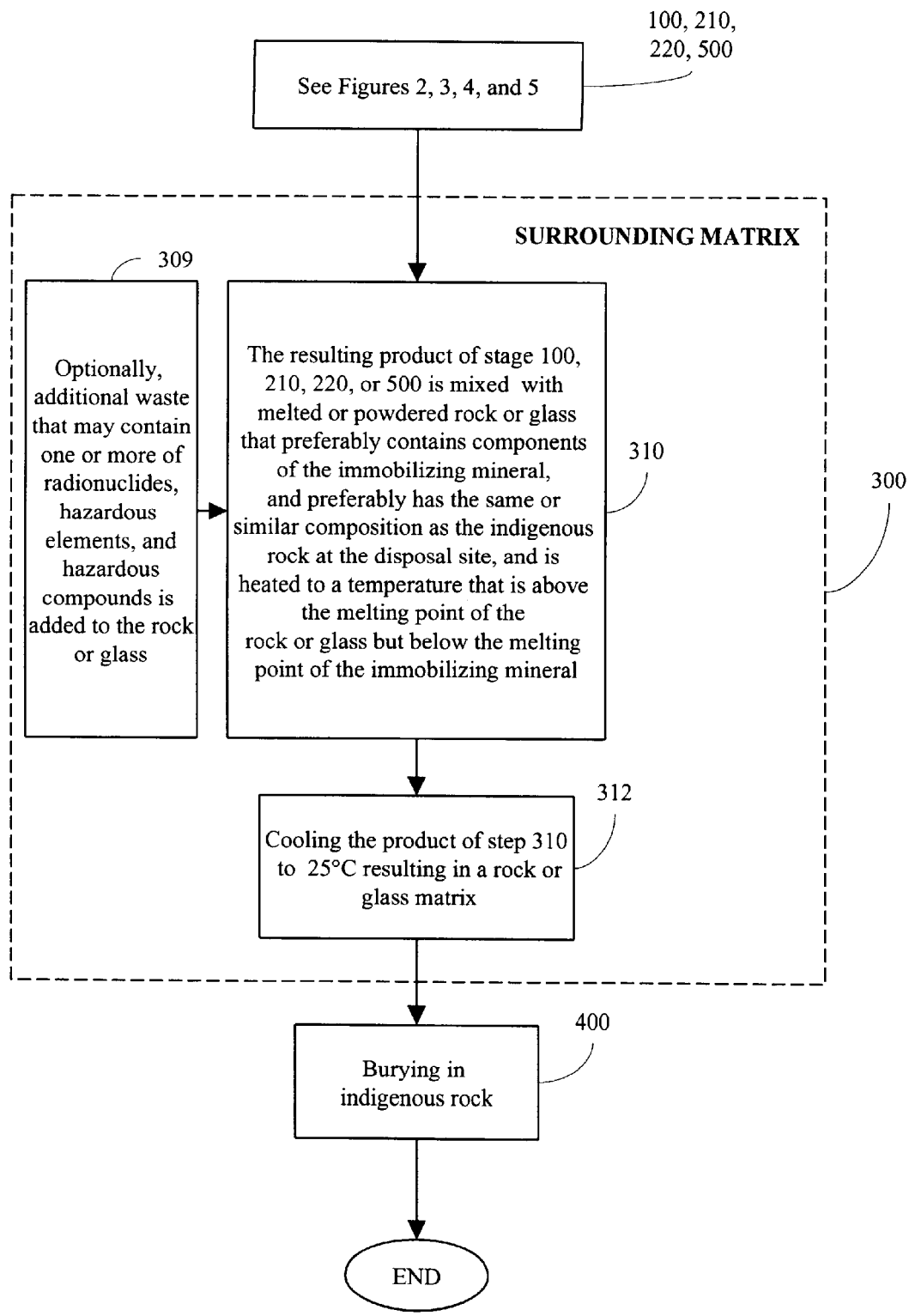
FIG. 6 is a flowchart showing alternative processes for covering one of the first and second barriers with a surrounding matrix comprising one of rock and glass.
Figure 7:
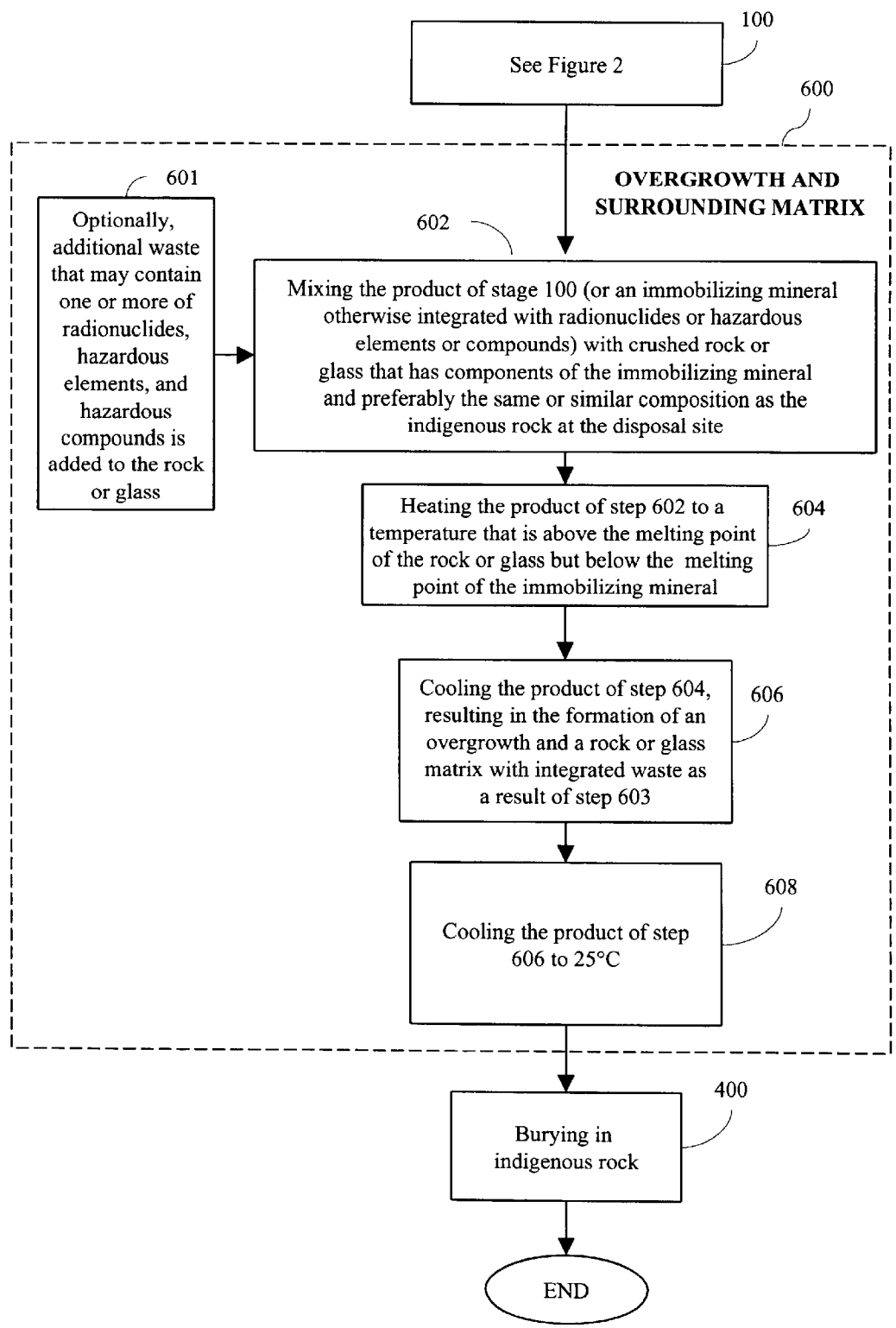
FIG. 7 is a flowchart showing alternative processes for creating the second and the third barriers in a single stage.

Stage 300 may be performed using a number of methods, including those shown in FIG. 6. Processes of stages 200 and 300 may be combined to create the second and third barriers in a single stage. For example, stage 600 shown in FIG. 7 illustrates how the overgrowth (the second barrier) may be embedded by the surrounding matrix (the third barrier) in a single stage.

In stage 400, the product of stage 300 is buried within an indigenous rock (or host rock) at a disposal site. The indigenous rock preferably has at least one mineral that is in common with the minerals contained in the third barrier.

Immobilized Waste Product of the Invention

Figure 8:
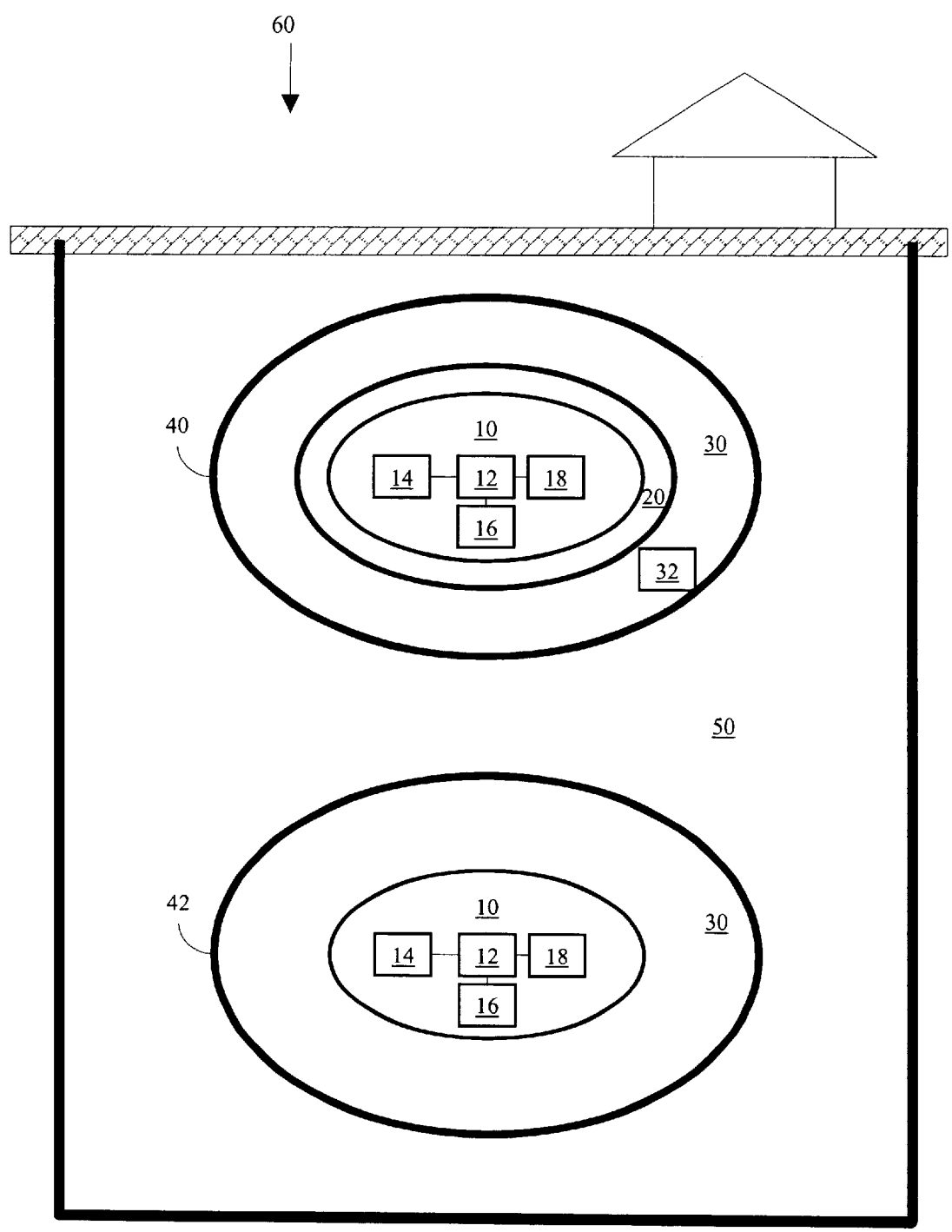
FIG. 8 is a schematic diagram showing cross-sectional views of two waste products of the preferred embodiments of the present invention.

FIG. 8 is a schematic diagram showing cross-sectional views of two immobilized waste products of the preferred embodiments of the present invention.

In one preferred embodiment of the present invention, product 40 comprises waste integrated mineral 10 (the first barrier), effective covering 20 (the second barrier), and surrounding matrix 30 (the third barrier), which can also integrate waste. Product 40 is buried in indigenous rock 50 at disposal site 60.

In another preferred embodiment of the present invention, product 42 comprises waste integrated mineral 10 and surrounding matrix 30. In this embodiment, effective covering 20 is not present. Product 42 is buried in indigenous rock 50 at disposal site 60.

Waste integrated mineral 10 comprises immobilizing mineral 12 integrated with one or more of radionuclides 14, hazardous elements 16, and hazardous compounds 18. Immobilizing mineral 12 can be one or more of phosphates, silicates, oxides, and clays. Specific examples of immobilizing mineral 12 are shown in Table 1.

The loading of radionuclides 14, hazardous elements 16, and hazardous compounds 18 in the waste integrated mineral (i.e., the ratio of the total weight of radionuclides 14, hazardous elements 16, and hazardous compounds 18 to the total weight of waste integrated mineral 10) is at least about two weight percent, preferably at least about ten weight percent, and more preferably at least about 75 weight %. In Example 1 discussed below, a waste oxide loading of approximately 75 weight % was attained. It must be emphasized that these waste oxide loadings are correct for the immobilizing minerals by themselves. If they are put in a surrounding matrix, the waste oxide loading will decrease. However, surrounding matrix 30 may also contain additional waste particles 32, which may contain radionuclides, hazardous elements, hazardous compounds, and/or other compounds present in the waste. In cases where waste oxides are loaded both in the immobilizing mineral and in the surrounding rock or glass matrix, the preferable waste oxide loading is approximately 60 weight %. In Example 8 discussed below, a waste oxide loading of approximately 60 weight % was attained.

In the case of high-level solid waste (such as in Examples 5–7) the preferable waste oxide loading is between 90 weight % and 100 weight %. This loading includes, in addition to radionuclides 14, hazardous elements 16, and hazardous compounds 18, and/or other compounds present in the waste.

Loadings and overgrowth thicknesses are determined by micro-probe analyses. A microprobe analysis is an X-ray analysis that utilizes a scanning electron microscope (SEM). The microprobe analysis can determine the composition of different materials by means of an electron beam that extracts electrons from the analyzed material. The extracted electrons reach detectors of the SEM that are calibrated to determine the concentration of the analyzed elements.

Waste integrated mineral 10 is covered by effective covering 20. Effective covering 20 is a layer of non-radioactive and non-hazardous material. Effective covering 20 can be created using one of an overgrowth procedure and a sintering process. Effective covering 20 produced by an overgrowth procedure is thicker than two microns. Preferably, effective covering 20 created by the overgrowth procedure is between about 2 microns and about 30 microns. Most preferably, effective covering 20 is about 50 microns. Effective covering 20 produced by sintering is at least several millimeters thick and can be as thick as one desires by performing sintering more than once.

Effective covering 20 is encapsulated in surrounding matrix 30. Surrounding matrix 30 is one of a rock matrix and a glass matrix. The rock used to create the rock matrix is one or more of sienite, granitoid, dacate, andesite, basalt, ultrabasic rocks, carbonatites, amphibolites, and clays. Specific examples of suitable rocks are shown in Table 2. The glass used to create the glass matrix is one or more of borosilicate, phosphorosilicate, alumophosphate, alumosilicate, and naturally-occurring glass.

Surrounding matrix 30 can represent between about 10% by weight and about 90% by weight of product 40. Preferably, surrounding matrix 30 represents between about 20% by weight and about 80% by weight, and most preferably between about 30% by weight and about 60% by weight of product 40. Accordingly, waste integrated mineral 10 (together with the effective covering, if any) represents between about 10% by weight and about 90% by weight of product 40, preferably, between 20% by weight and about 80% by weight of product 40, and most preferably between about 40% by weight and about 70% by weight of product 40.

Product 40 and product 42 are embedded within indigenous rock 50 of disposal site 60. If surrounding matrix 30 is rock or glass it preferably has a composition that is the same as or similar to the composition of indigenous rock 50. It is preferable that if surrounding matrix 30 is rock, it has at least one mineral that is in common with the minerals of indigenous rock 50. Suitable examples of indigenous rock 50 are shown in Table 3.

Stage 100: Integration

FIG. 2 is a flowchart showing alternative processes involved in integrating a waste into an immobilizing mineral to create a waste integrated mineral (the first barrier). The first integration process, referred herein as the activation-absorption-transformation process, includes one or more of steps 110, 112, and 114, as described below.

Activation

Step 110 involves the step of activating the immobilizing mineral to integrate with the radioactive or hazardous waste. The term "activating" or "activation" when referring to immobilizing minerals means any process that can enhance the capability of the immobilizing minerals to integrate with one or more of the radionuclides, hazardous elements, and hazardous compounds in the waste.

The process of activating the immobilizing mineral can involve a treatment with acid, base, or heat. Depending on the specific conditions of the waste and the immobilizing mineral, suitable acids can include HCl, $HNO_3$, $H_2SO_4$, and other acids. The concentration of the acid can be between about 1 M to about 6 M. Similarly, depending on the specific conditions of the waste and the immobilizing mineral, suitable bases can include NaOH, KOH, and other bases. The concentration of the base can be between about 1 M to about 3 M. If it is necessary to remove alkalines, acids will be used. If large anions must be removed, then bases will be used. If water or other volatiles must be removed, heat treatment may be used.

Activation can involve a treatment with high temperature by heating the immobilizing mineral to a temperature between about 200° C. and about 1200° C., preferably between about 400° C. and about 1000° C., and most preferably between about 500° C. and about 600° C. The duration for the heat treatment can be between about one hour and about 48 hours, preferably between about one hour and about 24 hours, and most preferably between about one hour and about 12 hours. An example of activation by high temperature is given in Examples 1 and 4, each of which involves heating a crushed natural calcium-zeolite to about 400° C. for about 12 hours to remove volatile components. The treatment with acid, base, or heat in step 110 is not always necessary.

Absorption

Next, one or more of the radionuclide, hazardous element, and hazardous compound associated with the waste is absorbed by the immobilizing mineral by using a solution in step 112. A solution comprising one or more of the radionuclide, hazardous element, and hazardous compound is contacted with the active immobilizing mineral. The term "active" used in this context means the immobilizing mineral is capable of integrating with the one or more of the radionuclide, hazardous element, and hazardous compound, but does not necessarily imply that additional steps have been taken to activate the immobilizing mineral. The solvent can be water, acid, or base, depending upon the composition of the waste.

The absorption of the one or more of the radionuclide, hazardous element, and hazardous compound may be performed by using a number of techniques. For example, the integration may be facilitated in step 112 by stirring the solution containing one or more of the radionuclide, hazardous element, and hazardous compound with the immobilizing mineral at a temperature. The temperature can be between about 25° C. and about 300° C., preferably between about 25° C. and about 200° C., and most preferably between about 25° C. and 90° C. The process may be performed at the atmospheric pressure. Examples of the absorption step are given in Examples 1 and 4.

Alternatively, the absorption may be facilitated in step 112 by filtering the solution or a gas containing the one or more of the radionuclide, hazardous element, and hazardous compound through the immobilizing mineral at a temperature. The temperature can be between about 25° C. and about 300° C., preferably between about 25° C. and about 200° C., and most preferably between about 25° C. and 90° C. Any excess solution can be re-circulated to be filtered again. The immobilizing mineral can be separated from the solution by a using centrifuge or by pumping.

Transformation

Some immobilizing minerals may not retain radionuclides, hazardous elements, or hazardous compounds in natural conditions because contact with solvents can cause the radionuclides, hazardous elements, or hazardous compounds to be removed from the immobilizing minerals. In these cases, the immobilizing minerals must be transformed to minerals that can retain radionuclides, hazardous elements, and hazardous compounds.

The transformation can be performed in step 114. In step 114, the product of step 112 is heated to a temperature for a duration. The temperature can be between about 200° C. and about 1200° C., preferably between about 400° C. and about 1000° C., and most preferably between about 600° C. and about 800° C., to transform a less stable mineral to a more stable one. The duration can be between about one hour and about 48 hours, preferably between about four hours and about 24 hours, and most preferably between about six hours and about 12 hours. For example, zeolites may be transformed into feldspar or plagioclase by heating at a temperature of between about 600° C. and about 800° C. for between about 6 hours to about 12 hours at the atmospheric pressure using a furnace. An example of the transformation step is given in Example 1.

Step 114 is not always a separate step in stage 100. Step 114 may be combined, for example, with other steps in stage 200 and stage 300 as demonstrated in Example 3.

If activation in step 110 is done by treatment with acid or base or any active solution, it may be necessary to wash the product of step 110 in water before performing step 112. Preferably, the product of step 112 is dried prior to the performance of step 114.

Synthesis of Immobilizing Mineral with Solid Waste

Using a second process or embodiment referred to herein as synthesis, solid waste or liquid waste can be integrated with the immobilizing mineral.

Synthesis of an immobilizing mineral with a solid waste can be performed in step 120. Components of an immobilizing mineral are mixed with the solid waste containing one or more of radionuclides, hazardous elements, and hazardous compounds at a temperature between about 200° C. and about 1600° C., preferably between about 400° C. and about 1400° C., and most preferably between about 900° C. and about 1200° C. The mixing can be done for between about one hour and about 72 hours, preferably between about one hour and 48 hours, and most preferably between about one hour and about 24 hours. Examples of the synthesis process are given in Examples 2 and 3.

Synthesis of Immobilizing Mineral with Liquid Waste

The integration of radionuclides, hazardous elements, and/or hazardous compounds in liquid waste with an immobilizing mineral may be achieved in step 120 by mixing components of the immobilizing mineral with liquid waste or a solvent containing one or more of radionuclides, hazardous elements, and hazardous compounds at a temperature for a duration. The solvent can be water, acid, or base, depending on the composition of the waste. The temperature can be between 200° C. and about 1600° C., preferably between about 400° C. and about 1400° C., and most preferably between about 900° C. and about 1200° C. Different minerals and different radionuclides and hazardous elements or compounds can require different temperatures. The duration can be between about one hour and about 72 hours, preferably between about one hour and about 48 hours, and most preferably between about one hour and about 24 hours. The process can be performed at the atmospheric pressure. The process can be done using a muffle furnace or a pilot furnace.

Solid State Reaction of the Components of the Waste

Integration of waste with an immobilizing mineral by solid state reaction can be done in step 130. A "solid state reaction" refers to a reaction between solid chemicals which are components of minerals. This reaction produces minerals from these components. In step 130, solid waste containing one or more of radionuclides, hazardous elements, and hazardous compounds and which may also contain components of an immobilizing mineral is heated at a temperature for a duration. The temperature can be between about 200° C. and about 1800° C., preferably between about 600° C. and about 1400° C., and most preferably between about 1000° C. and about 1200° C. The duration can be between about one hour and about 12 hours, preferably between about two hours and six hours, and most preferably between about two hours and about four hours. Examples of this step are given in Examples 6 and 7.

Optionally, components of an immobilizing mineral may be added and mixed with the solid waste prior to or during the heating. Examples of components of an immobilizing mineral are $SiO_2$ and $NaPO_3$. An example of this step is given in Example 5.

Result of Stage 100

Using an integration process described above or another integration method, one or more of radionuclides, hazardous elements, and hazardous compounds of the wastes replaces all or a portion of one or more elements in the crystal lattice of the immobilizing mineral. For example, as shown in Examples 2 and 3, elements lanthanum (La) and cerium (Ce) in monazite (a phosphorus mineral of rare earth elements) can be replaced by the radioactive elements uranium (U) and/or thorium (Th), or other actinides or lanthanides, that are present in the wastes. The ratio of radionuclide, hazardous elements, and hazardous compound to waste integrated mineral (the first barrier) (i.e., the loading) depends on properties of the immobilizing mineral. The integration stage of the process results in a radionuclide loading greater than 2% by weight. Preferably, the integration stage results in a loading of at least about 10% by weight. More preferably, a loading of at least about 50% by weight is achieved. As mentioned above, the waste oxide loading can be as high as 100 weight %, as in the case of Example 5. The waste integrated mineral that results from the integration process has a particle size ranging from about 10 microns up to 1 cm, depending upon the particle size of the immobilizing mineral used in the process. Smaller particle sizes for the immobilizing mineral are preferred because of higher surface area and higher absorption. The particle size of the resulting waste integrated mineral is preferably about 300 to 500 microns.

Stare 210: Overgrowth

Figure 3:
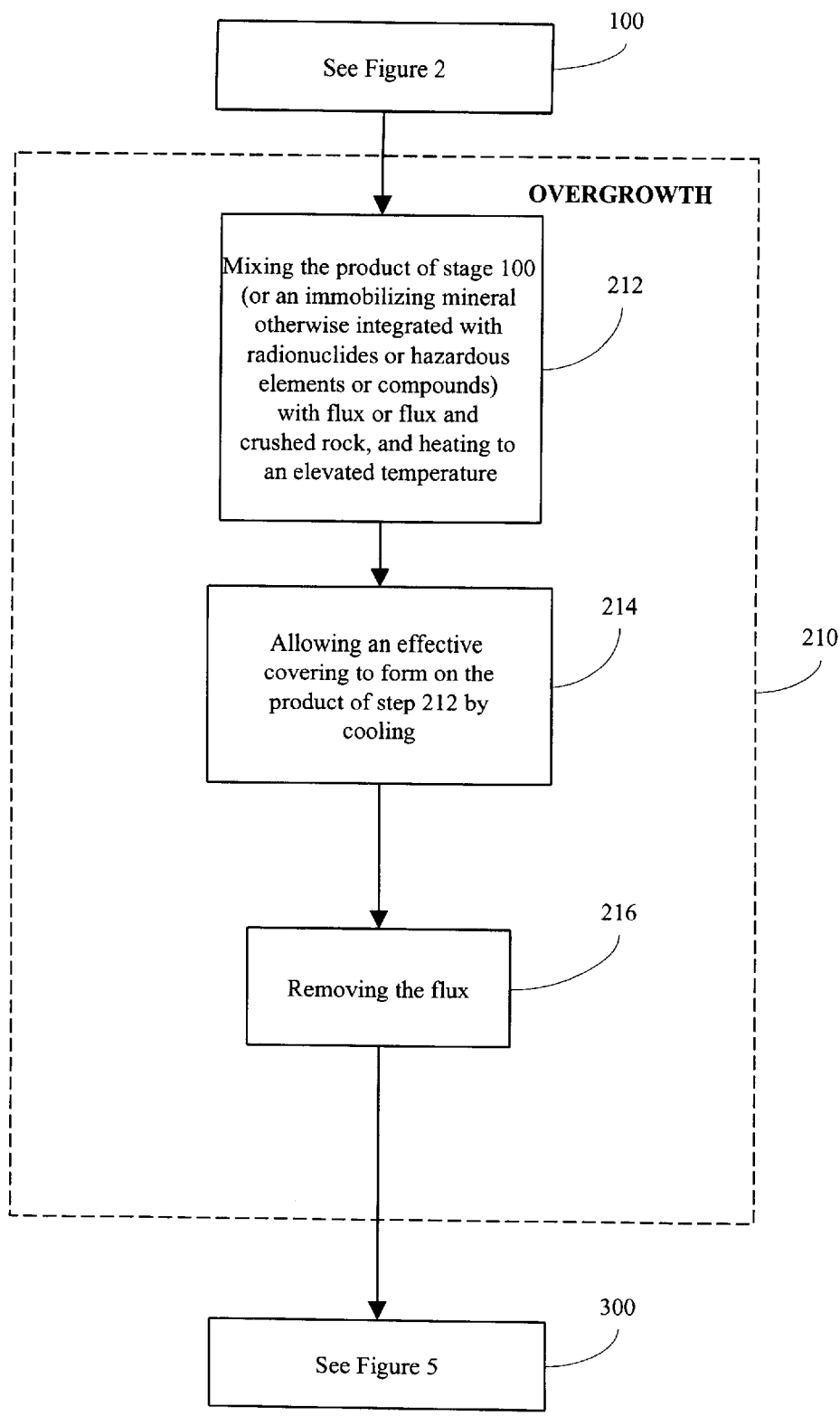
FIG. 3 is a flowchart showing alternative processes for creating a second barrier using an overgrowth procedure.

FIG. 3 is a flowchart showing alternative processes for covering or surrounding the waste integrated mineral (the first barrier) with either more of the same immobilizing mineral or another mineral having a composition that is the same as or similar to the composition of the immobilizing mineral, to create a second barrier in stage 210 using an overgrowth procedure. Note that stage 210 can be performed by itself, i.e., without having to perform stage 100 first, if the radionuclides, hazardous elements, or compounds are already incorporated in an immobilizing mineral.

Stage 210 uses flux. The term "flux" refers to any chemical substance that is used as a solvent and to reduce the temperature of a process. Two specific examples of flux are $Na_2B_4O_7.10H_2O$ and $CaF_2$. According to one embodiment, the covering of the first barrier by an overgrowth procedure may be achieved as follows.

In step 212, the waste integrated mineral from stage 100 (or an immobilizing mineral otherwise integrated with radionuclides and hazardous elements or compounds) is mixed with the flux or a mixture of flux and crushed rock. The mixture is heated to a temperature for a duration. The temperature can be between about 600° C. and about 1400° C., preferably between about 800° C. and about 1300° C., and most preferably between about 1000° C. and about 1200° C. The duration can be for between about four hours and about 72 hours, preferably between about six hours and about 48 hours, and most preferably between about six hours and about 24 hours. The process may be performed at the atmospheric pressure using a furnace. Both the flux and the crushed rock contain components of the immobilizing mineral. If the matrix does not have sufficient amounts of the components of the immobilizing mineral, additional amounts may be added to produce a thicker overgrowth.

In step 214, an effective covering or overgrowth (the second barrier) can form on the waste integrated mineral (the first barrier). The term "effective covering" means a covering sufficient to isolate the waste comprising radionuclides, hazardous elements, and/or hazardous compounds, thereby minimizing the occurrence of chemical interaction between the waste and the biosphere. The effective covering or the second barrier is a non-radioactive and non-hazardous crystalline covering having a composition that is the same as or similar to the composition of the immobilizing mineral.

Step 214 may be achieved by cooling the product from step 212 at a constant or inconstant rate down to a temperature of about 600° C., for between about one hour and about 72 hours, preferably between about one hour and about 48 hours, and most preferably between about one hour and about 24 hours.

Alternatively, step 214 may be achieved by cooling the product from step 212 down to a temperature of about 600° C. and maintaining the temperature for between about 24 hours (one day) and about 168 hours (seven days), preferably between about 36 hours (three days) and about 120 hours (five days), and most preferably between about 72 hours (three days) and about 48 hours (four days).

The flux used in step 212 can then be removed in step 216 by dissolving the result of step 214 in a solution. The solution may either be boiling water or other solvents such as acid and base. For example, if $Na_2B_4O_7.10H_2O$ is used as the flux, it will be dissolved in boiling water. If $CaF_2$ is used as the flux, it will be dissolved in HCl acid. The waste integrated mineral with an effective covering can then be separated from the solution by air drying, filtering, extracting by a centrifuge, or another method. An example of the overgrowth procedure with addition of flux is given in Example 2.

Stage 220: Sintering

According to another embodiment for creating an effective covering, the product of stage 100 (or an immobilizing mineral otherwise integrated with radionuclides and hazardous elements or compounds) can be provided with a second barrier using sintering in stage 220. In step 222, the waste integrated mineral from stage 100 is mixed with the same mineral that was used as the immobilizing mineral in stage 100, and heated to a temperature for a duration. The temperature can be between about 200° C. and 1400° C., preferably between about 500° C. and about 1300° C., and most preferably between about 1000° C. and about 1200° C. The duration can be between about one hour and about 72 hours, preferably between about one hour and about 48 hours, and most preferably between about one hour and about 24 hours. The process can be performed at the atmospheric pressure using a furnace. The resultant product of this process is a polycrystalline conglomerate. The ratio of first barrier to the additional minerals is between about 40% and about 70% by weight.

In step 224, a covering is formed on the immobilizing mineral. Step 224 maybe achieved by cooling the product of step 222 to about 25° C., producing a high-density ceramic in which crystals of the immobilizing mineral containing the one or more of radionuclides, hazardous elements, and hazardous compounds are surrounded by crystals of the immobilizing mineral which do nor contain any or only a very low concentration of radionuclides, hazardous elements, or hazardous compounds.

Sintering may be performed more than once. Subsequent to a first sintering performance in step 224, there may still remain some radioactive or hazardous crystals on the surface of the ceramic. A second sintering may be performed in step 226 by mixing the product of step 224 with the same minerals that were used as immobilizing minerals, and heating to a temperature between about 200° C. and 1400° C. for between about one hour and about 72 hours. Step 228 may then be performed by cooling the product of step 226 to room temperature, to produce a high-density ceramic in which there are essentially no crystals containing radionuclides or hazardous elements or compounds on the surface of the ceramic. An example of the sintering process is given in Example 3.

Stage 500: Integration and Overgrowth in a Single Stage

FIG. 5 is a flowchart showing the steps involved in creating the first and the second barriers in a single stage. Stage 500 comprises steps 502, 504, and optionally 508, depending on a decision in step 506. Step 502 may be performed in accordance with the procedure described above in step 130.

The product of step 502 can be cooled in step 504 using one of several regimens. For example, cooling of the product of step 502 can be achieved at a constant or an inconstant rate down to a temperature of about 600° C., and maintaining the temperature for between about one hour and 72 hours.

Alternatively, cooling of the product of step 502 can be brought down to a temperature of about 600° C., and maintaining the temperature for between about 24 hours and about 168 hours (seven days), preferably between about 36 hours and about 120 hours (five days), and most preferably between about 48 hours and about 72 hours (three days).

The cooling process in step 504 results in crystallization of the product of step 502 into one or more specific crystals of the reacted minerals with all of the radionuclides, hazardous elements, or compounds integrated into the crystals. For example, if $SiO_2$ is added in step 502 to a waste containing CaO and $ZrO_2$, at the end of this process (at the conclusion of step 504) $CaZrO_3$ and/or $ZrSiO_4$ will be produced as the reacted mineral. In some cases, an effective covering of the immobilizing mineral may be formed on the first barrier. Since distribution of radionuclides in the immobilizing mineral depends on the kinetics of crystallization, in some cases, crystals with radionuclides in the center surrounded by a non-radioactive layer may be obtained.

If in step 506 it is determined that the resulting product of step 504 will not be surrounded by a matrix (the third barrier) in stage 300, the temperature of the product from step 504 is reduced further to about 25° C. in step 508. Otherwise, the process goes to stage 300.

Stage 300: Surrounding Matrix

FIG. 6 is a flowchart showing alternative processes for embedding one of the first barrier and the second barrier of stages 100, 210, 220, or 500 in a surrounding matrix (the third barrier). Note that the first barrier can be surrounded by the third barrier directly. The third barrier can be a rock matrix or a glass matrix. The rock or glass used to create the third barrier preferably contains components of the immobilizing mineral. Components of the immobilizing mineral can be oxides, halides, hydroxides, or water associated with the immobilizing mineral in stage 300.

In step 310, the resulting product from one of stages 100, 210, 220, and 500 (i.e., one or both of the first and second barriers) is mixed with either powdered or melted rock or glass. Optionally, additional waste that may contain radionuclides, hazardous elements, hazardous compounds, and/or other compound present in the waste, is added and mixed with the rock or glass in step 309. This mixture is heated to a temperature that is above the melting point of the rock or glass but below the melting point of the immobilizing mineral (usually between about 800° C. and about 1300° C.), and maintained at that temperature for between about 30 minutes to about two hours. The heating can be performed at the atmospheric pressure using a furnace. A rock or glass matrix is then formed around the immobilizing mineral containing the waste in step 312. The rock or glass will form a matrix that surrounds the waste integrated mineral (with or without an effective covering) and also surrounds any additional waste (which may contain radionuclides, hazardous elements, hazardous compounds, and/or other compounds present in the waste, if they were added in step 309. Step 312 may be achieved by cooling the result of step 310 at a constant rate to a temperature as low as about 25° C. Examples of this step are given in Examples 2 and 3.

Stage 600: Overgrowth and Surrounding Matrix in a Single Stage

Stages 200 and 300 may be combined as a single stage if the rock or glass matrix have sufficient amount of the components of the immobilizing mineral to produce an overgrowth. FIG. 7 is a flowchart showing alternative processes for creating the second and the third barriers in a single stage. In step 602, the product of stage 100 or an immobilizing mineral otherwise integrated with one or more radionuclides, hazardous elements, and hazardous compound is mixed with crushed rock or glass that has components of the immobilizing mineral and preferably the same or similar composition as the indigenous rock at the disposal site. Optionally, additional waste that may contain radionuclides, hazardous elements, hazardous compounds, and/or other compounds present in the waste, is added and mixed with the rock or glass in step 601. If the crushed rock or glass does not have sufficient amounts of the components of the immobilizing mineral, additional amounts may be added to produce a thicker overgrowth layer.

In step 604, the mixture of step 602 is heated to a temperature that is above the melting point of the rock or glass but below the melting point of the immobilizing minerals (usually between about 800° C. and about 1300° C.), and maintained for between about 30 minutes to about two hours.

In step 606, the product of step 604 is cooled to result in the formation of an overgrowth and of a rock or glass matrix which surrounds both the waste integrated mineral with an effective covering and any additional waste that was added in step 601. In one embodiment, step 606 may be achieved by cooling the product from step 604 at a constant or inconstant rate down to about 600° C., for between about one hour and about 72 hours, preferably between about one hour and about 48 hours, and most preferably between about one hour and about 24 hours. In another embodiment, step 606 may be achieved by cooling the product from step 604 down to about 600° C. and maintaining the temperature for between about 24 hours and about 168 hours (seven days), preferably between about 36 hours and about 120 hours (five days), and most preferably between about 48 hours and about 72 hours (three days).

In step 608, the product of step 606 is further cooled down to a temperature of about 25° C. An example of stage 600 is given in Example 1.

A Preferred Embodiment of the System for Immobilizing Liquid Waste

Figure 9:
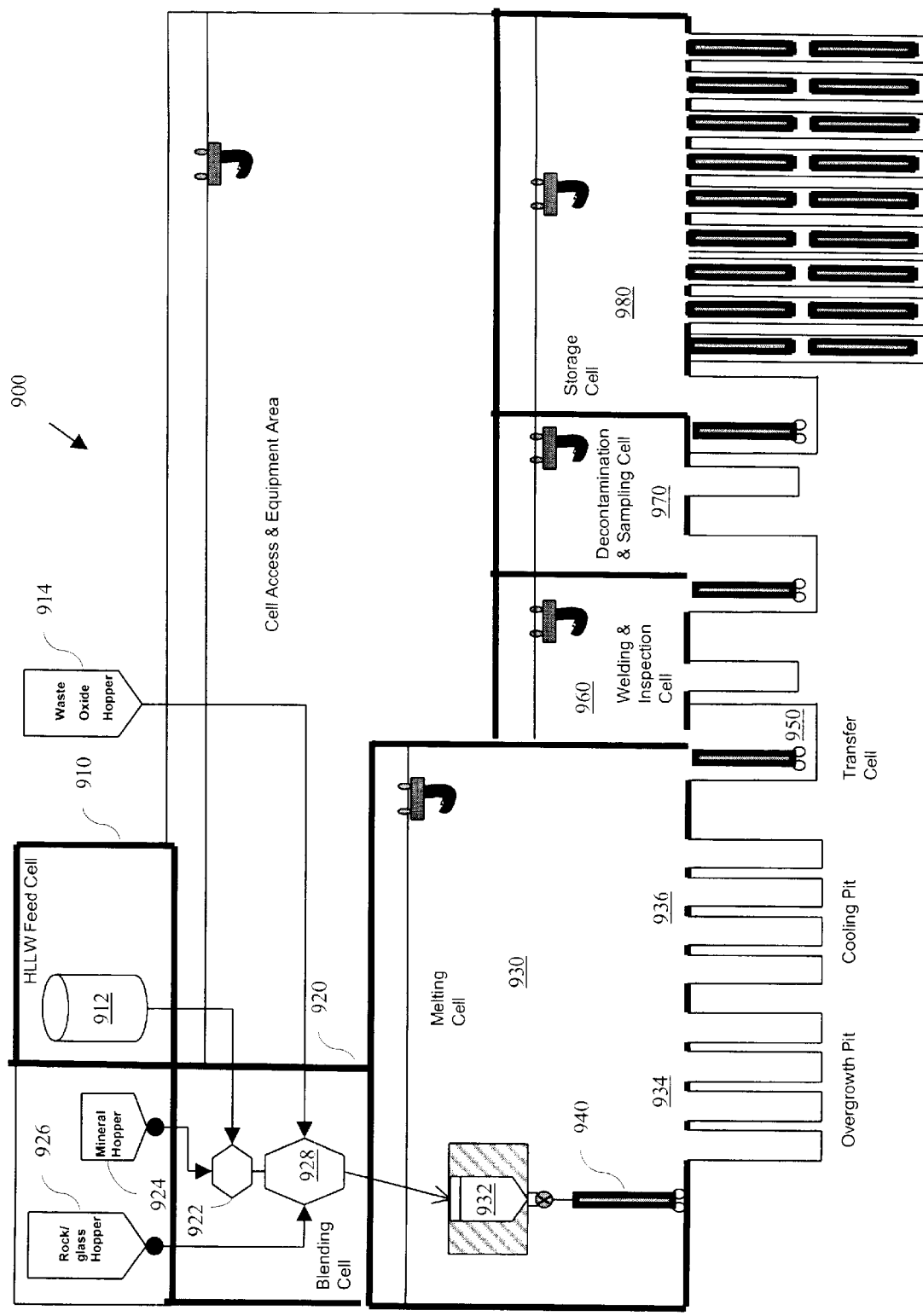
FIG. 9 is a schematic diagram showing a facility for the solidification or immobilization of high-level radioactive liquid wastes in accordance with an embodiment of the present invention.

FIG. 9 is a schematic diagram showing a facility for the solidification or immobilization of high-level radioactive liquid wastes in accordance with an embodiment of the present invention. Facility 900 comprises high-level radioactive liquid waste (HLLW) feed cell 910, blending cell 920, melting cell 930, transfer cell 950, welding and inspection cell 960, decontamination and sampling cell 970, and storage cell 980.

HLLW feed cell 910 can comprise one or more liquid waste feed tank 912. Blending cell 920 comprises blender 922, mineral hopper 924, rock/glass hopper 926, and melter feed hopper 928. Melting cell 930 comprises melter 932, at least one overgrowth pit 934, and at least one cooling pit 936.

Liquid waste feed tank 912 contains the liquid waste comprising one or more of radionuclides, hazardous elements, and hazardous compounds. Mineral hopper 924 comprises the immobilizing mineral to be used to integrate with the radioactive and hazardous components of the liquid waste. Rock/glass hopper 926 comprises one of rock and glass for the surrounding matrix.

The liquid waste and an immobilizing mineral can be stirred in blender 922 in order to integrate the radionuclides with the immobilizing mineral to form a waste integrated mineral. The resulting waste mineral is then transferred to melter feed hopper 928. The rock or glass from rock/glass hopper 926 is introduced to melter feed hopper 928 together with the waste integrated mineral and together with additional solid form waste containing radionuclides, hazardous elements, hazardous compounds, and/or other compounds present in the waste from waste oxide hopper 914. A combination of these three feeds is then transferred to melter 932.

At melter 932, the one of rock and glass, the waste integrated mineral and additional solid waste are heated. The temperature in melter 932 is controlled such that the rock or glass melts while the waste integrated mineral remains in solid form. The product (which comprises melted rock or glass containing solid waste and waste integrated mineral) from melter 932 is then poured into canister 940. Canister 940 with the product is subsequently placed in overgrowth pit 934 where it is cooled in order to create an overgrowth and to form a rock or glass matrix. It is then transferred to cooling pit 936 where it is further cooled to ambient temperature. A typical canister is constructed from stainless steel or an inert alloy. The dimensions of the typical canister are 0.61 meter in diameter and would range in size between 2.5 to 4.5 meters high.

Canister 940 containing a product of the present invention can then be processed in accordance with known prior art processes. For example, canister 940 can be placed in transfer cell 950 until it is ready for further processing. In welding and inspection cell 960, a lid is welded onto canister 940. Integrity of the welding can be inspected in at an inspection station within welding and inspection cell 960.

Canister 940 with the welded lid is transferred to decontamination and sampling cell 970. Decontamination of residual surface contamination and swipe sampling of the surface to determine the remaining level of surface contamination of canister 940 can be performed in decontamination and sampling cell 970. Finally, canister 940 is disposed of or stored in storage cell 980 where it would remain until removed for permanent disposal.

A Preferred embodiment of the Method for Immobilizing Liquid Waste

Figure 10:
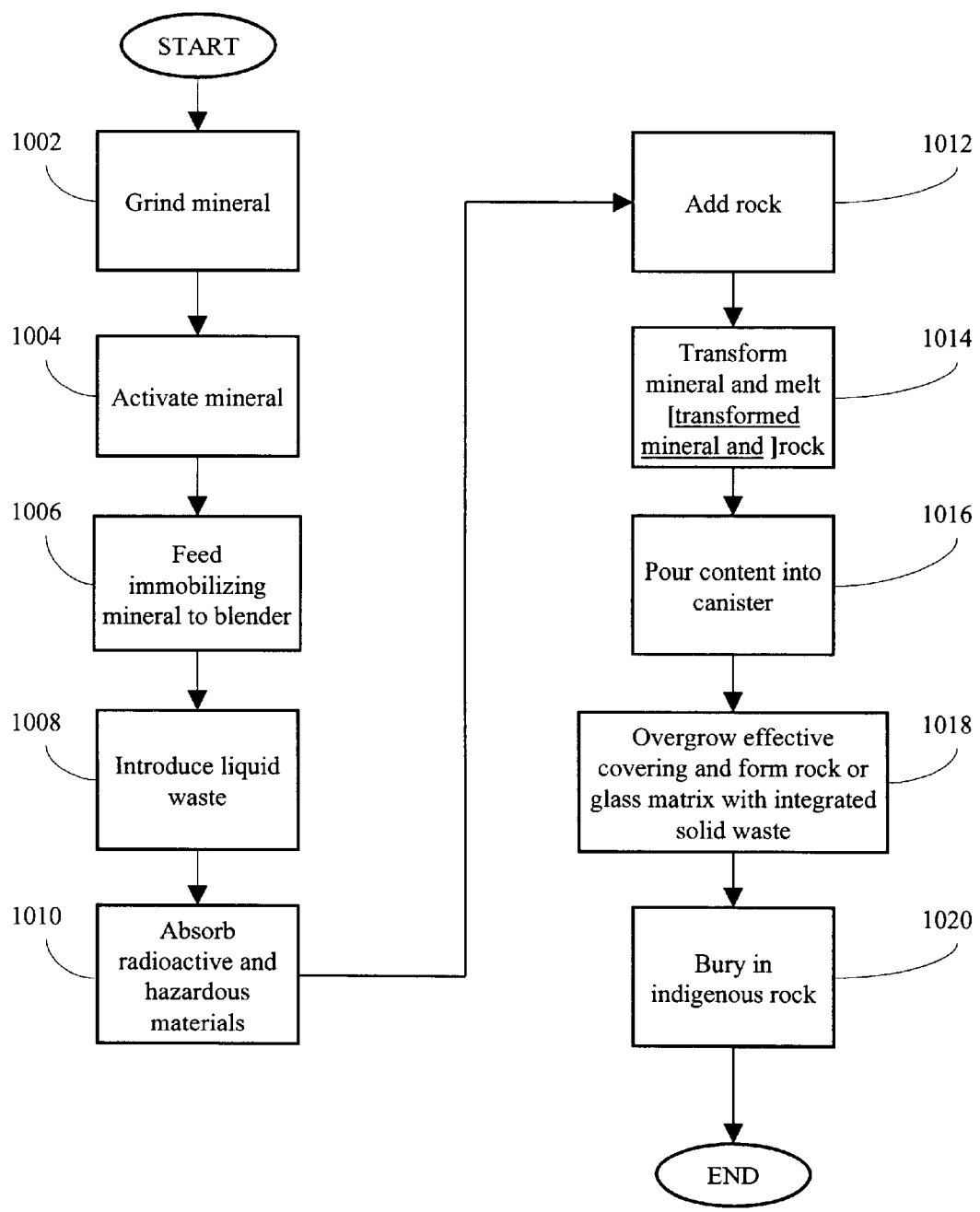
FIG. 10 is a flowchart showing the typical steps involved in the solidification or immobilization of high-level radioactive liquid wastes in accordance with an embodiment of the present invention.

FIG. 10 is a flowchart showing the typical steps involved in one method of immobilizing of liquid wastes containing one or more of radionuclides, hazardous elements, and hazardous compounds using the facility shown in FIG. 9 in accordance with an embodiment of the present invention.

In step 1002, an immobilizing mineral is ground or crushed to a suitable particle size. Subsequently in step 1004, the immobilizing mineral is activated using a process discussed above and placed in mineral hopper 924. In step 1006, the activated immobilizing mineral is transferred to blender 922.

In step 1008, the liquid waste from liquid waste feed tank 912 is introduced into blender 922. In step 1010, the activated mineral and the liquid waste are stirred in blender 922 until the activated mineral is saturated with radionuclides, hazardous elements, and/or hazardous components from the liquid waste.

In step 1012, the waste integrated mineral, crushed rock from rock/glass hopper 926 and additional solid waste from solid waste hopper 914, are added through hopper 928 to melter 932.

In step 1014, the content in melter 932 comprising the crushed rock/glass, the waste integrated mineral and the additional solid waste, is melted and held at the melt temperature for a sufficient amount of time to permit the melt to come to the appropriate homogeneity. At this time, the waste integrated mineral is transformed (the first barrier) and the solid waste is integrated into the rock/glass matrix.

In step 1016, the melted content from melter 932 is poured into canister 940. In step 1018, canister 940 is moved to overgrowth pit 934 in which canister 940 and the content is cooled according to a certain regimen to form an effective covering (the second barrier) using the overgrowth procedure and a surrounding rock matrix is formed on the waste integrated mineral and/or the effective covering (the third barrier) and additional solid waste is immobilized in the rock/glass matrix. In step 1020, the product of the present invention can be buried in indigenous rock at a disposal site.

Advantages over Prior Art Processes

As described above, the present invention can immobilize radioactive and hazardous wastes more effectively and more efficiently than prior art processes. Specific advantages of the present invention over prior art vitrification processes can be summarized as follows.

Cost Advantages

A process of the present invention provides a substantially higher waste oxide loading than prior art vitrification processes. Waste oxide loading is the ratio of the weight of waste oxides to the weight of the final product. The waste loading oxide obtainable using the present invention is at least about 60% by weight (see Example 8), which is significantly greater than the waste oxide loading achieved in prior art vitrification processes. Waste oxide loading in vitrification processes is limited due to the solubility of the waste oxides, and due to the presence of some anions in the waste, such as sulphates, which weaken the properties of the glass. The present invention overcomes these limitations. The present invention is not limited by the solubility of the waste oxides because the oxides are immobilized within the immobilizing mineral. Those oxides which are integrated in the surrounding rock or glass matrix are not dissolved in the present invention. In an embodiment of the present invention, sulphate is also integrated into the immobilizing mineral, thereby inhibiting the weakness of the glass.

The process of the present invention can be carried out in the same or shorter amount of time than existing vitrification processes. As mentioned above, the process of the present invention can achieve higher waste oxide loading than existing vitrification processes. This means that the present invention can immobilize the same amount of waste in substantially less time than it would take using the prior art vitrification process. It also means that, for a given amount of waste, the final product of the present invention occupies substantially less volume than the final product of the prior art vitrification process, which means the final product of the present invention can result in significant cost savings associated with final disposal.

Safety Advantages

The present invention utilizes minerals to immobilize radioactive or hazardous wastes. Minerals provide a more stable thermodynamic system to withstand environmental conditions than glass that is used in prior art vitrification processes.

The present invention provides as many as four physicochemical barriers against leaching and diffusion. A first barrier is provided by the integration of radionuclides with the immobilizing mineral to create a waste integrated mineral in which the radionuclides, hazardous elements, and/or hazardous compounds are strongly bonded to other elements of the immobilizing mineral. Microprobe analyses of the of the product of the present invention demonstrates that the radionuclides are integrated with the immobilizing mineral.

A second barrier is created by the physicochemical method of covering of the immobilizing mineral by a non-radioactive and non-hazardous mineral layer, which effectively inhibits both leaching and diffusion of radionuclides from the immobilizing mineral. The second barrier can be created by an overgrowth procedure or by sintering. A 20-micron covering created by an overgrowth procedure can offer protection for approximately 200,000 years. A 50-micron covering attainable by the present invention offers protection for approximately one million years. In the case of sintering, the covering formed is a minimum of several millimeters. Therefore, the level of protection attained is at least as much as that offered by a 50-micron overgrowth.

A third barrier against leaching and diffusion is created by the surrounding matrix comprising one of rock and glass that surrounds the first and/or second barriers. This rock or glass matrix is also a first barrier for radionuclides, hazardous elements, and/or hazardous compounds contained in any additional solid waste that is added to the rock or glass which forms the surrounding matrix.

A fourth barrier is created by insuring that the rock matrix corresponds to the indigenous rock at the disposal site. The ground water or hydrothermal solutions are saturated with components of the indigenous rock of the disposal area. Thus, when they make contact with the rock matrix covering the synthesized immobilizing mineral, the leaching process will be negligible because the rock matrix is in equilibrium with both the ground water and the hydrothermal solutions.

Prior art vitrification processes offer only the third of these four physicochemical barriers. Furthermore, the bonds between the waste and immobilizing material created by prior art vitrification processes are weaker than those achieved using the present invention. In addition, waste immobilized in prior art vitrification processes is uniformly distributed throughout the entire volume of the glass matrix, which can lead to leaching and contamination of the biosphere. Using the present invention, the same amount of waste (or more) is concentrated within the immobilizing material.

According to the present invention, the waste constitutes between approximately 50 and 70% by volume of the rock matrix, while the remaining 30 to 50% by volume is non-radioactive or non-hazardous.

Another advantage of the present invention over prior art vitrification processes is that the present invention can result in an extremely low leaching rate, as shown in an Inductively Coupled Plasma (ICP) leaching test that is required by the International Atomic Energy Agency. An ICP is a type of spectrometer in which, due to the influence of plasma, all sample atoms being analyzed become excited/energized. This emits a signal that is detected by the calibrated detector in the ICP spectrometer. This method attains a high level of detection (part per billion (ppb)). The samples analyzed by the ICP are deposited in distilled water at a temperature of 90° C. for a 30-day period.

The following leaching rate results are obtained with the present invention.

For liquid waste immobilized in accordance with an embodiment of the present invention, a leaching rate of about $10^{-5}$ g/m$^2$×day was obtained, which is two orders of magnitude lower (i.e., 100 times slower) than the leaching rate achieved in prior art vitrification processes. This leaching rate was obtained with samples that were cut open, with the rock matrix barrier broken, which simulates the situation of an earthquake or another destruction of the rock or glass matrix. Clearly, the leaching rate of a sample with the rock matrix intact would be lower. For solid wastes immobilized in accordance with an embodiment of the present invention, a leaching rate of about $10^{-4}$ g/m$^2$×day is obtained for samples without a rock or glass matrix (i.e., without the third barrier).

In the present invention, the first three barriers against leaching also effectively decrease the rate of diffusion of radionuclides, hazardous elements, and/or hazardous compounds to a negligible level, e.g., between about $10^{-20}$ cm$^2$/sec and about $10^{-14}$ cm$^2$/sec. The diffusion rate can be determined using any known methods, including those described in "*Dynamic Phenomena of Fluid Magmatic Systems*, Chekhmir et al.," "(Nauka Edition)", Moscow, 1991, which is incorporated herein by reference in its entirety. Actinides and lanthanides (high-level waste radionuclides) are large cations. Diffusion of large cations out of the waste integrated mineral and the rock matrix is very low ($10^{-20}$ to $10^{-18}$ cm$^2$/sec). This is one or two orders of magnitude lower than the diffusion rate of the same cations in borosilicate glass.

The present invention does not require hydrothermal conditions. Preferred processes of the present invention can be performed at temperatures below 1200° C., which is within the capabilities of existing vitrification melters.

The leaching and diffusion barriers offered by the present invention enable high-level radioactive wastes to be disposed of with fewer expensive engineered barriers than are necessary with prior art vitrification processes. For example, using the present invention, the corrosion-resistant containers (one barrier) and the backfill around the containers (another barrier) of a prior art multi-barrier disposal system can be eliminated. Associated with the elimination of these two layers are significant cost savings. For example, each corrosion-resistant container (which can cost as much as $500,000 per container) can only accommodate five canisters of vitrified waste.

All of the examples discussed below were conducted in experiments with non-radioactive materials having stable isotopes and analogues. However, radioactive materials can be similarly processed.

Figure 11:
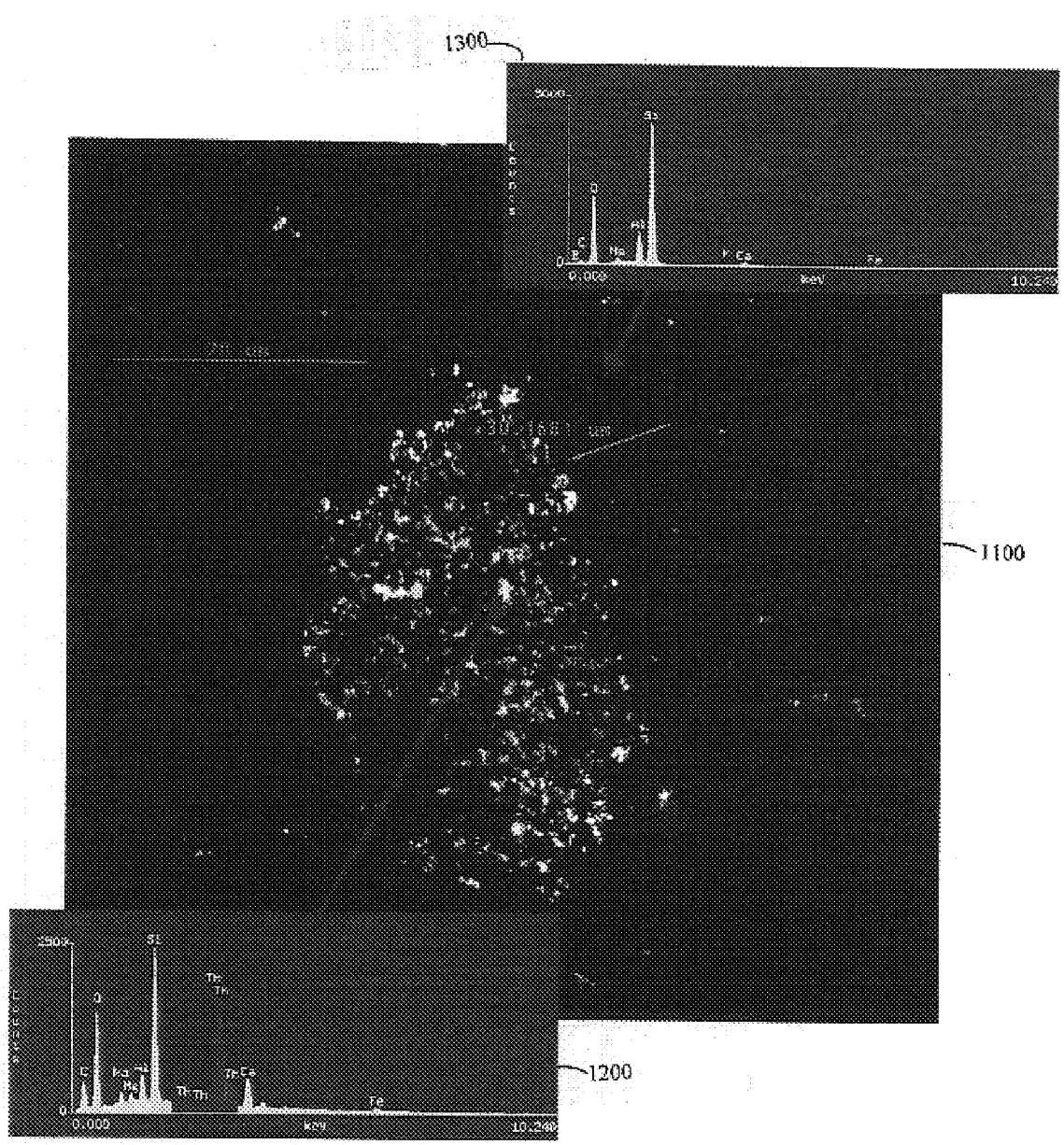
FIG. 11 depicts a typical magnified view of a crystal of a waste integrated mineral of the present invention.

Image 1100 in FIG. 11 is created by a scanning electron microscope (SEM) and depicts a typical magnified view of a crystal of a waste integrated mineral of the present invention. The crystal shown in image 1100 is a Th-integrated-plagioclase crystal comprising Th integrated with zeolite that was transformed into plagioclase. The Th-integrated-plagioclase is covered by an overgrowth that is about 30 microns thick. The thickness of the overgrowth is determined using a cut and polished sample by conducting a microprobe analysis at points at 5 micron increments along a line which approximately intersects the center of cross-section of the waste integrated mineral. The locations of the inner and outer boundaries of the overgrowth layer are determined by noting where the composition changes.

Th is depicted as white dots in image 1100. By visual inspection, it can be observed that Th is concentrated within the central region of the crystal.

The high concentration of Th in the middle section of the crystal is further confirmed by a microprobe analysis of the central region of the crystal, the result of which is shown in bottom spectrum 1200. The overgrowth layer contains little or no Th, as indicated in top spectrum 1300 that represents a result of a microprobe analysis of the overgrowth layer.

EXAMPLES

The following examples are intended to illustrate certain specific embodiments of the present invention, and thus the examples should not be used to limit the scope of the claims.

Example 1

Method for Immobilizing Liquid Form Waste in Natural Minerals

1. Activation A natural calcium-zeolite was crushed and heated to about 400° C. for about 12 hours to remove volatile components.

2. Absorption Thorium nitrate crystalline hydrate was dissolved in water resulting in an aqueous solution containing thorium. This solution was then stirred with the calcium-zeolite crystals (the crystals had a particle size of less than 300 microns) at room temperature and then dried in a furnace at 110° C. for about two hours.

3. Transformation The resulting crystals were then heated for about 12 hours at about 800° C. resulting in the calcium-zeolite being transformed into feldspar containing thorium. The heating was done at the atmospheric pressure in a furnace.

4. Overgrowth+Glass Matrix The result was mixed with crushed obsidian and heated at about 1200° C. for several hours and then cooled by gradual decrease in temperature for up to 48 hours until reaching 600° C. This was then cooled to 25° C. This resulted in an obsidian matrix which contained feldspar crystals containing thorium covered by a feldspar layer. This was determined by a microprobe analysis.

5 Microprobe Analysis Tables 4A through 4C below (Microprobe Analysis 1) represent the result of a microprobe analysis of a crystal of zeolite transformed into plagioclase with Th integrated within. In Microprobe Analysis 1, ten different points within the same mineral crystal were analyzed to determine a statistical loading of Th. The waste oxide loading for each element listed in the left most column of the tables is shown in the "compound weight %" column, which is the second column from the right. The average loading of Th for this waste integrated mineral is approximately 75 weight % ((77.19+76.94+74.68+65.59+73.48+86.39+74.36+77.01+73.56+75.67)/10=75.48).

TABLE 4A (Microprobe Analysis 1)
Quantitative Analysis
Note--No user references for 15 kV are present in the my_stnds database.
Now performing analysis with standardless references.
Wed Jan 10 10:49:37 2001
PROZA Correction Acc. Volt. = 15 kV Take-off Angle = 40.00 deg

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| R 10 point 1 | | | | | | | | |
| Si—K | 0.0538 | 1.289 | 12.74 | 6.93 | +/−0.06 | SiO2 | 14.82 | 4.767 |
| Th—M | 0.5823 | 1.165 | 15.10 | 67.84 | +/−0.82 | ThO2 | 77.19 | 5.649 |
| Ca—K | 0.0232 | 1.067 | 3.19 | 2.47 | +/−0.15 | CaO | 3.46 | 1.192 |
| K—K | 0.0094 | 0.917 | 1.14 | 0.86 | +/−0.16 | K2O | 1.04 | 0.426 |
| Mg—K | 0.0013 | 1.909 | 0.54 | 0.25 | +/−0.04 | MgO | 0.42 | 0.202 |
| S—K | 0.0000 | 1.040 | 0.00 | 0.00 | +/−0.00 | SO3 | 0.00 | 0.000 |
| Cs—L | 0.0000 | 1.308 | 0.00 | 0.00 | +/−0.00 | Cs2O | 0.00 | 0.000 |
| Na—K | 0.0007 | 2.568 | 0.42 | 0.19 | +/−0.05 | Na2O | 0.25 | 0.158 |
| Fe—K | 0.0032 | 0.947 | 0.28 | 0.31 | +/−0.15 | FeO | 0.40 | 0.106 |

TABLE 4A-continued (Microprobe Analysis 1)
Quantitative Analysis
Note--No user references for 15 kV are present in the my_stnds database.
Now performing analysis with standardless references.
Wed Jan 10 10:49:37 2001
PROZA Correction Acc. Volt. = 15 kV Take-off Angle = 40.00 deg

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Al—K | 0.0081 | 1.573 | 2.45 | 1.28 | +/−0.07 | Al2O3 | 2.42 | 0.917 |
| O—K | — | 2.990 | 64.14 | 19.87 S | — | — | — | — |
| Total | | | 100.00 | 100.00 | | | 100.00 | 13.417 |
| Point 2 | | | | | | | | |
| Si—K | 0.0516 | 1.289 | 12.22 | 6.65 | +/−0.05 | SiO2 | 14.22 | 4.586 |
| Th—M | 0.5805 | 1.165 | 15.04 | 67.61 | +/−0.72 | ThO2 | 76.94 | 5.646 |
| Ca—K | 0.0294 | 1.066 | 4.04 | 3.13 | +/−0.07 | CaO | 4.38 | 1.514 |
| K—K | 0.0079 | 0.917 | 0.96 | 0.73 | +/−0.07 | K2O | 0.88 | 0.360 |
| Mg—K | 0.0009 | 1.911 | 0.37 | 0.18 | +/−0.04 | MgO | 0.29 | 0.140 |
| S—K | 0.0008 | 1.048 | 0.13 | 0.08 | +/−0.04 | SO3 | 0.20 | 0.048 |
| Cs—L | 0.0000 | 1.309 | 0.00 | 0.00 | +/−0.00 | Cs2O | 0.00 | 0.000 |
| Na—K | 0.0011 | 2.569 | 0.65 | 0.29 | +/−0.05 | Na2O | 0.39 | 0.244 |
| Fe—K | 0.0028 | 0.948 | 0.25 | 0.27 | +/−0.13 | FeO | 0.35 | 0.093 |
| Al—K | 0.0079 | 1.573 | 2.39 | 1.25 | +/−0.04 | Al2O3 | 2.36 | 0.896 |
| O—K | — | 3.018 | 63.95 | 19.82 S | — | — | — | — |
| Total | | | 100.00 | 100.00 | | | 100.00 | 13.528 |

The number of cation results are based upon 24 Oxygen atoms
Table Symbols: S -- Wt. % calculated by Stoichiometry

TABLE 4B (Microprobe Analysis 1)

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Point 3 | | | | | | | | |
| Si—K | 0.0625 | 1.296 | 14.07 | 8.10 | +/−0.06 | SiO2 | 17.33 | 5.260 |
| TH—M | 0.5557 | 1.181 | 13.80 | 65.63 | +/−0.73 | ThO2 | 74.68 | 5.157 |
| Ca—K | 0.0100 | 1.075 | 1.31 | 1.08 | +/−0.12 | CaO | 1.51 | 0.491 |
| K—K | 0.0120 | 0.930 | 1.39 | 1.11 | +/−0.15 | K2O | 1.34 | 0.519 |
| Mg—K | 0.0011 | 1.907 | 0.41 | 0.20 | +/−0.04 | MgO | 0.34 | 0.152 |
| S—K | 0.0010 | 1.064 | 0.15 | 0.10 | +/−0.04 | SO3 | 0.25 | 0.058 |
| Cs—L | 0.0004 | 1.320 | 0.02 | 0.06 | +/−0.17 | Cs2O | 0.06 | 0.008 |
| Na—K | 0.0022 | 2.555 | 1.18 | 0.56 | +/−0.05 | Na2O | 0.75 | 0.441 |
| Fe—K | 0.0039 | 0.957 | 0.33 | 0.37 | +/−0.13 | FeO | 0.48 | 0.122 |
| Al—K | 0.0109 | 1.573 | 3.11 | 1.72 | +/−0.04 | Al2O3 | 3.25 | 1.163 |
| O—K | — | 2.927 | 64.22 | 21.06 S | — | — | — | — |
| Total | | | 100.00 | 100.00 | | | 100.00 | 13.370 |
| Point 4 | | | | | | | | |
| Si—K | 0.0652 | 1.295 | 13.33 | 8.44 | +/−0.09 | SiO2 | 18.05 | 5.119 |
| Th—M | 0.4780 | 1.206 | 11.02 | 57.64 | +/−0.69 | ThO2 | 65.59 | 4.233 |
| Ca—K | 0.0784 | 1.078 | 9.36 | 8.46 | +/−0.15 | CaO | 11.83 | 3.595 |
| K—K | 0.0043 | 0.951 | 0.46 | 0.41 | +/−0.07 | K2O | 0.49 | 0.177 |
| Mg—K | 0.0013 | 1.898 | 0.46 | 0.25 | +/−0.04 | MgO | 0.42 | 0.176 |
| S—K | 0.0009 | 1.079 | 0.14 | 0.10 | +/−0.04 | SO3 | 0.25 | 0.053 |
| Cs—L | 0.0023 | 1.352 | 0.11 | 0.32 | +/−0.17 | Cs2O | 0.34 | 0.041 |
| Na—K | 0.0008 | 2.555 | 0.41 | 0.21 | +/−0.05 | Na2O | 0.29 | 0.159 |
| Fe—K | 0.0060 | 0.991 | 0.47 | 0.59 | +/−0.13 | FeO | 0.76 | 0.181 |
| Al—K | 0.0067 | 1.570 | 1.73 | 1.05 | +/−0.04 | Al2O3 | 1.99 | 0.664 |
| O—K | — | 3.258 | 62.50 | 22.53 S | — | — | — | — |
| Total | | | 100.00 | 100.00 | | | 100.00 | 14.398 |
| Point 5 | | | | | | | | |
| Si—K | 0.0542 | 1.291 | 12.29 | 7.00 | +/−0.05 | SiO2 | 14.97 | 4.662 |
| Th—M | 0.5489 | 1.176 | 13.73 | 64.58 | −/−0.70 | ThO2 | 73.48 | 5.210 |
| Ca—K | 0.0514 | 1.069 | 6.77 | 5.50 | +/−0.08 | CaO | 7.69 | 2.568 |
| K—K | 0.0050 | 0.927 | 0.58 | 0.46 | +/−0.07 | K2O | 0.55 | 0.220 |
| Mg—K | 0.0012 | 1.909 | 0.47 | 0.23 | +/−0.04 | MgO | 0.39 | 0.179 |

TABLE 4B-continued

(Microprobe Analysis 1)

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| S—K | 0.0004 | 1.056 | 0.06 | 0.04 | +/−0.04 | SO3 | 0.10 | 0.023 |
| Cs—L | 0.0000 | 1.324 | 0.00 | 0.00 | +/−0.12 | Cs2O | 0.00 | 0.000 |
| Na—K | 0.0010 | 2.569 | 0.56 | 0.26 | +/−0.05 | Na2O | 0.35 | 0.214 |
| Fe—K | 0.0038 | 0.961 | 0.32 | 0.36 | −/−0.13 | FeO | 0.47 | 0.121 |
| Al—K | 0.0067 | 1.574 | 1.94 | 1.06 | +/−0.04 | Al2O3 | 2.00 | 0.735 |
| O—K | — | 3.123 | 63.27 | 20.51 S | — | — | — | — |
| Total | | | 100.00 | 100.00 | | | 100.00 | 13.932 |

Point 6

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Si—K | 0.0329 | 1.275 | 9.18 | 4.19 | +/−0.05 | SiO2 | 8.96 | 3.392 |
| Th—M | 0.6769 | 1.122 | 20.12 | 75.92 | +/−0.74 | ThO2 | 86.39 | 7.440 |
| Ca—K | 0.0097 | 1.046 | 1.55 | 1.01 | +/−0.05 | CaO | 1.41 | 0.574 |
| K—K | 0.0044 | 0.882 | 0.60 | 0.38 | +/−0.07 | K2O | 0.46 | 0.223 |
| Mg—K | 0.0011 | 1.915 | 0.55 | 0.22 | +/−0.04 | MgO | 0.36 | 0.204 |
| S—K | 0.0008 | 1.003 | 0.16 | 0.08 | +/−0.04 | SO3 | 0.21 | 0.060 |
| Cs—L | 0.0000 | 1.274 | 0.00 | 0.00 | +/−0.00 | Cs2O | 0.00 | 0.000 |
| Na—K | 0.0012 | 2.573 | 0.85 | 0.32 | +/−0.05 | Na2O | 0.43 | 0.315 |
| Fe—K | 0.0018 | 0.909 | 0.18 | 0.17 | +/−0.13 | FeO | 0.21 | 0.067 |
| Al—K | 0.0052 | 1.571 | 1.88 | 0.82 | +/−0.04 | Al2O3 | 1.56 | 0.695 |
| O—K | — | 2.887 | 64.92 | 16.89 S | — | — | — | — |
| Total | | | 100.00 | 100.00 | | | 100.00 | 12.970 |

TABLE 4C

(Microprobe Analysis 1)

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|

Point 7

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Si—K | 0.0652 | 1.296 | 14.59 | 8.44 | +/−0.09 | SiO2 | 18.06 | 5.430 |
| Th—M | 0.5526 | 1.183 | 13.67 | 65.35 | +/−0.72 | ThO2 | 74.36 | 5.088 |
| Ca—K | 0.0130 | 1.075 | 1.69 | 1.40 | +/−0.12 | CaO | 1.95 | 0.629 |
| K—K | 0.0094 | 0.932 | 1.09 | 0.88 | +/−0.14 | K2O | 1.06 | 0.405 |
| Mg—K | 0.0012 | 1.903 | 0.46 | 0.23 | +/−0.04 | MgO | 0.38 | 0.170 |
| S—K | 0.0001 | 1.056 | 0.02 | 0.01 | +/−0.04 | SO3 | 0.03 | 0.006 |
| Cs—L | 0.0000 | 1.315 | 0.00 | 0.00 | +/−0.00 | Cs2O | 0.00 | 0.000 |
| Na—K | 0.0011 | 2.557 | 0.58 | 0.27 | +/−0.05 | Na2O | 0.37 | 0.215 |
| Fe—K | 0.0052 | 0.959 | 0.43 | 0.49 | +/−0.13 | FeO | 0.64 | 0.160 |
| Al—K | 0.0106 | 1.571 | 3.00 | 1.67 | +/−0.04 | Al2O3 | 3.15 | 1.116 |
| O—K | — | 2.930 | 64.48 | 21.26 S | — | — | — | — |
| Total | | | 100.00 | 100.00 | | | 100.00 | 13.221 |

Point 8

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Si—K | 0.0603 | 1.292 | 14.05 | 7.80 | +/−0.08 | SiO2 | 16.68 | 5.217 |
| Th—M | 0.5780 | 1.171 | 14.76 | 67.68 | +/−0.73 | ThO2 | 77.01 | 5.483 |
| Ca—K | 0.0072 | 1.070 | 0.97 | 0.77 | +/−0.12 | CaO | 1.07 | 0.360 |
| K—K | 0.0090 | 0.922 | 1.08 | 0.83 | +/−0.15 | K2O | 1.00 | 0.400 |
| Mg—K | 0.0009 | 1.909 | 0.37 | 0.18 | +/−0.04 | MgO | 0.29 | 0.137 |
| S—K | 0.0000 | 1.046 | 0.00 | 0.00 | +/−0.00 | SO3 | 0.00 | 0.000 |
| Cs—L | 0.0000 | 1.305 | 0.00 | 0.00 | +/−0.00 | Cs2O | 0.00 | 0.000 |
| Na—K | 0.0017 | 2.560 | 0.96 | 0.44 | +/−0.05 | Na2O | 0.59 | 0.358 |
| Fe—K | 0.0036 | 0.948 | 0.31 | 0.35 | +/−0.13 | FeO | 0.44 | 0.116 |
| Al—K | 0.0098 | 1.572 | 2.89 | 1.54 | +/−0.04 | Al2O3 | 2.91 | 1.072 |
| O—K | — | 2.901 | 64.61 | 20.43 S | — | — | — | — |
| Total | | | 100.00 | 100.00 | | | 100.00 | 13.143 |

Point 9

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Si—K | 0.0606 | 1.293 | 13.53 | 7.84 | +/−0.06 | SiO2 | 16.76 | 5.092 |
| Th—M | 0.5470 | 1.182 | 13.51 | 64.65 | +/−0.71 | ThO2 | 73.56 | 5.085 |
| Ca—K | 0.0331 | 1.073 | 4.30 | 3.55 | +/−0.07 | CaO | 4.97 | 1.618 |
| K—K | 0.0076 | 0.931 | 0.88 | 0.71 | +/−0.07 | K2O | 0.86 | 0.332 |
| Mg—K | 0.0008 | 1.906 | 0.32 | 0.16 | +/−0.04 | MgO | 0.26 | 0.119 |
| S—K | 0.0006 | 1.063 | 0.10 | 0.07 | +/−0.04 | SO3 | 0.17 | 0.038 |
| Cs—L | 0.0000 | 1.322 | 0.00 | 0.00 | +/−0.00 | Cs2O | 0.00 | 0.000 |
| Na—K | 0.0017 | 2.557 | 0.94 | 0.44 | +/−0.05 | Na2O | 0.60 | 0.353 |

TABLE 4C-continued (Microprobe Analysis 1)

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Fe—K | 0.0017 | 0.963 | 0.14 | 0.16 | +/−0.13 | FeO | 0.21 | 0.053 |
| Al—K | 0.0088 | 1.571 | 2.48 | 1.38 | +/−0.07 | Al2O3 | 2.61 | 0.934 |
| O—K | — | 3.039 | 63.79 | 21.04 S | — | — | — | — |
| Total | | | 100.00 | 100.00 | | | 100.00 | 13.623 |
| Point 10 | | | | | | | | |
| Si—K | 0.0602 | 1.292 | 13.82 | 7.78 | +/−0.06 | SiO2 | 16.64 | 5.160 |
| Th—M | 0.5661 | 1.175 | 14.30 | 66.50 | +/−0.72 | ThO2 | 75.67 | 5.340 |
| Ca—K | 0.0153 | 1.072 | 2.04 | 1.64 | +/−0.13 | CeO | 2.29 | 0.761 |
| K—K | 0.0134 | 0.925 | 1.58 | 1.24 | +/−0.15 | K2O | 1.49 | 0.591 |
| Mg—K | 0.0008 | 1.904 | 0.32 | 0.16 | +/−0.04 | MgO | 0.26 | 0.120 |
| S—K | 0.0000 | 1.048 | 0.00 | 0.00 | +/−0.00 | SO3 | 0.00 | 0.000 |
| Cs—L | 0.0000 | 1.312 | 0.00 | 0.00 | +/−0.00 | Cs2O | 0.00 | 0.000 |
| Na—K | 0.0009 | 2.560 | 0.50 | 0.23 | +/−0.05 | Na2O | 0.31 | 0.186 |
| Fe—K | 0.0029 | 0.953 | 0.25 | 0.28 | +/−0.12 | FeO | 0.36 | 0.093 |
| Al—K | 0.0101 | 1.570 | 2.92 | 1.58 | +/−0.04 | Al2O3 | 2.99 | 1.092 |
| O—K | — | 2.966 | 64.27 | 20.61 S | — | — | — | — |
| Total | | | 100.00 | 100.00 | | | 100.00 | 13.343 |

Example 2

Method for Immobilizing Solid Form Waste in Synthesized Minerals

1. Synthesis $Ce_2O_3$ and $NaPO_3$ and $La_2O_3$ (the components of monazite) were taken and about 10% to 15% by weight of the cerium and lanthanum were replaced by uranium and thorium. This was done by heating all of these components together at 1200° C. for about two days at the atmospheric pressure using a furnace. The result was synthesized monazite in which part of the cerium and lanthanum were replaced by uranium and thorium. The synthesized monazite was then quenched outside the furnace.

2. Overgrowth with Addition of Flux The synthesized monazite was then mixed with $Na_2B_4O_7 \cdot 10H_2O$ containing $Ce_2O_3+P_2O_5$. This was then heated at 900° C. for about two days at the atmospheric pressure in the furnace. This was then cooled to room temperature for eight hours by turning off the furnace. This resulted in an overgrowth of the immobilizing mineral. Next, the $Na_2B_4O_7 \cdot 10H_2O$ was dissolved in boiling water, leaving monazite crystals with uranium and thorium inside covered with a layer of monazite without uranium and thorium.

3. Glass Matrix These crystals were then mixed with crushed obsidian and melted at 1000° C. for several hours, and then cooled by gradual decrease of temperature to 400° C. for eight hours. This resulted in a block of obsidian with the encapsulated monazite crystals inside. This was determined by a microprobe analysis.

Example 3

Method for Immobilizing Solid Form Waste in Synthesized Minerals

1. Synthesis The synthesis procedure of Example 2 was used.

2. Sintering The synthesized monazite containing the uranium and thorium was mixed with natural monazite of the same composition but without uranium and thorium. About 25% by weight of the synthesized monazite was mixed with 75% by weight of the natural monazite using a mortar by hand. This mixture was heated to about 900° C. to 1000° C. at atmospheric pressure in a furnace for about one day and then was cooled by gradual decrease of temperature to room temperature for eight hours. This results in a conglomerate comprising monazite crystals containing uranium and thorium surrounded by monazite crystals without uranium and thorium.

3. Sintering a Second Time Some uranium and thorium crystals may remained on the surface. Approximately 10% by volume of crushed monazite was then added to the conglomerate of crystals and heated to about 900° C. to 1000° C. for one-half hour, resulting in the addition of a monazite layer of approximately 2 mm thickness covering the synthesized monazite. This was determined by microprobe analysis. This was then cooled by gradual decrease of temperature to room temperature for eight hours.

4. Glass Matrix The resultant product was mixed with crushed obsidian and melted at about 1100° C. for about two hours. This was then cooled by gradual decrease of temperature to room temperature for eight hours.

Example 4

Method for Immobilizing Liquid Form Waste in Natural Minerals

1. Activation A natural calcium-zeolite was crushed and heated to about 400° C. for about 12 hours to remove volatile components.

2. Absorption Both cerium chloride and thorium nitrate were dissolved in water resulting in an aqueous solution containing cerium and thorium. This solution was then stirred with the calcium-zeolite at room temperature. The Calcium-zeolite was then washed in alcohol at room temperature and then dried at 110° C. for about two hours.

3. Transformation+Overgrowth+Rock matrix (All in One Step) It was then mixed with tuff. Tuff is an acidic rock, which comprises one or more oxides such as $SiO_2$, $Al_2O_3$, CaO, and $Na_2O$, containing one or more minerals such as quartz, albite, and plagioclase. The result was heated until melted for about two hours at 1200° C. and cooled by gradual decrease of temperature for 48 hours until reaching 600° C. This was then cooled to 25° C. The resulting product was a dense glass incorporating all of the above compounds. This resulted in the calcium-zeolite (a) being transformed into plagioclase containing cesium and thorium since tuff contains the components of plagioclase, (b) covered with a non-radioactive layer of plagioclase, and (c) all of this covered in a tuff matrix.

4. Microprobe Analysis Tables 5A through 5D below (Microprobe Analysis 2) represent the result of a microprobe analysis of a crystal of zeolite transformed into plagioclase with Th integrated within. In Microprobe Analysis 2, the concentration of Th in the center of the crystal is 62.44 weight % as shown in Table 5A. The concentration of Th near the edge of the crystal is 30.06 weight % as shown in Table 5B. Loading of 30.06 weight % is obtained due to the microprobe beam being focused half in the crystal and half in the overgrowth. The concentration of Th at a region several microns outside the edge of the crystal is 3.02 weight % as shown in Table 5C. Loading of 3.02 weight % is obtained due to the microprobe beam being focused slightly within the crystal. The concentration of Th in the rock matrix surrounding the crystal is 0.44 weight % as shown in Table 5D. Loading of 0.44 weight % is less than the detection limit of Th. As indicated in Tables 5A through 5D, concentration of Th decreases from the center of the crystal to the rock matrix. Microprobe Analysis 2 demonstrates that the waste oxides has been effectively immobilized by the immobilizing mineral.

TABLE 5A (Microprobe Analysis 2)
Quantitative Analysis
Sun Oct 29 12:47:39 2000

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Na—K | 0.0048 | 2.432 | 1.84 | 1.18 | +/−0.11 | Na2O | 1.59 | 0.230 |
| Al—K | 0.0244 | 1.537 | 4.98 | 3.75 | +/−0.11 | Al2O3 | 7.09 | 0.624 |
| Si—K | 0.1174 | 1.313 | 19.68 | 15.42 | +/−0.16 | SiO2 | 32.98 | 2.464 |
| Th—M | 0.3829 | 1.277 | 7.56 | 48.91 | +/−0.96 | ThO2 | 55.65 | 0.946 |
| K—K | 0.0221 | 1.009 | 2.05 | 2.23 | +/−0.21 | K2O | 2.69 | 0.256 |
| Cs—L | 0.0000 | 1.373 | 0.00 | 0.00 | +/−0.00 | Cs2O | 0.00 | 0.000 |
| O—K | — | 2.848 | 63.89 | 28.51 S | — | — | — | — |
| Total | | | 100.00 | 100.00 | | | 100.00 | 4.521 |
| Na—K | 0.0028 | 2.486 | 1.22 | 0.70 | +/−0.11 | Na2O | 0.95 | 0.152 |
| Al—K | 0.0222 | 1.552 | 5.08 | 3.45 | +/−0.12 | Al2O3 | 6.52 | 0.634 |
| Si—K | 0.0971 | 1.313 | 18.05 | 12.75 | +/−0.15 | SiO2 | 27.28 | 2.250 |
| Th—M | 0.4415 | 1.243 | 9.40 | 54.88 | +/−1.01 | ThO2 | 62.44 | 1.172 |
| K—K | 0.0191 | 0.981 | 1.91 | 1.88 | +/−0.22 | K2O | 2.26 | 0.238 |
| Cs—L | 0.0038 | 1.355 | 0.15 | 0.52 | +/−0.25 | Cs2O | 0.55 | 0.019 |
| O—K | — | 2.865 | 64.18 | 25.82 S | — | — | — | — |
| Total | | | 100.00 | 100.00 | | | 100.00 | 4.465 |

The number of cation results are based upon 8 Oxygen atoms
Table Symbols: S -- Wt. % calculated by Stoichiometry

TABLE 5B (Microprobe Analysis 2)
Quantitative Analysis
Sun Oct 29 12:55:36 2000
Sample R 3

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Na—K | 0.0075 | 2.213 | 1.93 | 1.66 | +/−0.06 | Na2O | 2.24 | 0.243 |
| Al—K | 0.0408 | 1.453 | 5.90 | 5.93 | +/−0.11 | Al2O3 | 11.21 | 0.742 |
| Si—K | 0.1871 | 1.304 | 23.29 | 24.40 | +/−0.17 | SiO2 | 52.20 | 2.929 |
| Th—M | 0.1906 | 1.386 | 3.05 | 26.42 | +/−0.73 | ThO2 | 30.06 | 0.384 |
| K—K | 0.0280 | 1.098 | 2.10 | 3.07 | +/−0.17 | K2O | 3.70 | 0.265 |
| Cs—L | 0.0039 | 1.427 | 0.11 | 0.56 | +/−0.21 | Cs2O | 0.60 | 0.014 |
| O—K | — | 2.651 | 63.61 | 37.96 S | — | — | — | — |
| Total | | | 100.00 | 100.00 | | | 100.00 | 4.577 |

The number of cation results are based upon 8 Oxygen atoms
Table Symbols: S -- Wt. % calculated by Stoichiometry

TABLE 5C (Microprobe Analysis 2)
Quantitative Analysis
Sun Oct 29 12:57:30 2000
Sample R 3

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Na—K | 0.0076 | 1.939 | 1.35 | 1.47 | +/−0.08 | Na2O | 1.98 | 0.169 |
| Al—K | 0.0462 | 1.333 | 4.83 | 6.16 | +/−0.11 | Al2O3 | 11.65 | 0.605 |
| Si—K | 0.2868 | 1.255 | 27.11 | 35.99 | +/−0.21 | SiO2 | 77.00 | 3.394 |
| Th—M | 0.0177 | 1.503 | 0.24 | 2.66 | +/−0.27 | ThO2 | 3.02 | 0.030 |
| K—K | 0.0374 | 1.194 | 2.42 | 4.47 | +/−0.15 | K2O | 5.38 | 0.303 |
| Cs—L | 0.0062 | 1.473 | 0.14 | 0.91 | +/−0.19 | Cs2O | 0.97 | 0.018 |
| O—K | — | 2.421 | 63.90 | 48.34 S | — | — | — | — |
| Total | | | 100.00 | 100.00 | | | 100.00 | 4.519 |

The number of cation results are based upon 8 Oxygen atoms
Table Symbols: S -- Wt. % calculated by Stoichiometry

TABLE 5D (Microprobe Analysis 2)
Quantitative Analysis
Sun Oct 29 13:19:51 2000
Sample R 3 (matrix)

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Na—K | 0.0054 | 1.907 | 0.91 | 1.03 | +/−0.05 | Na2O | 1.39 | 0.112 |
| Al—K | 0.0266 | 1.312 | 2.64 | 3.49 | +/−0.06 | Al2O3 | 6.59 | 0.324 |
| Si—K | 0.3380 | 1.219 | 29.94 | 41.21 | +/−0.22 | SiO2 | 88.16 | 3.681 |
| Th—M | 0.0025 | 1.529 | 0.03 | 0.39 | +/−0.22 | ThO2 | 0.44 | 0.004 |
| K—K | 0.0216 | 1.214 | 1.37 | 2.62 | +/−0.07 | K2O | 3.16 | 0.168 |
| Cs—L | 0.0018 | 1.482 | 0.04 | 0.26 | +/−0.16 | Cs2O | 0.28 | 0.005 |
| O—K | — | 2.304 | 65.07 | 51.01 S | — | — | — | — |
| Total | | | 100.00 | 100.00 | | | 100.00 | 4.295 |

The number of cation results are based upon 8 Oxygen atoms
Table Symbols: S -- Wt. % calculated by Stoichiometry

Example 5

Method for Immobilizing Liquid Form Waste in Natural Minerals (Integrating Waste with Immobilizing minerals)

1. Mixing Simulation of Waste Composition with Simulation of Radionuclides (Found in the Waste) $Al_2O_3$, $CaCO_3$, $H_3BO_3$, $ZrO_2$, and $CaF_2$, were mixed to simulate a waste composition. Oxides of Sr, Cs, Ce, La, U and Th (1% by weight of each) were added to simulate the radionuclides in this waste.

2. Integrating Waste with Immobilizing Minerals This mixture was heated to 1250° C. and maintained at this temperature for about two hours.

The temperature was then decreased at an inconstant rate down to 600° C during the course of about 48 hours. This resulted in complete crystallization of the mixture into several synthetic minerals. These minerals included primarily calcium zirconate, fluorite, and zircon. All of the oxides which simulated the radionuclides were integrated into the crystals. The temperature was then reduced to 25° C. during the course of about four hours, by turning off the furnace.

3. Microprobe Analysis Tables 6A through 6C below (Microprobe Analysis 3) represent the result of a microprobe analysis of a crystal of an immobilizing mineral with solid waste integrated within by a solid state reaction. The result tabulated in Tables 6A through 6C shows that the solid state reaction formed several immobilizing minerals including calcium-zirconate, aluma-calcium zirconate, and zircon. In this example, one weight % of Th was put into the waste simulate. As indicated in Table 6C that contains the result of a microprobe analysis of a zircon mineral, a very high concentration of Th (about 83 weight %) was incorporated in this mineral. This result demonstrates that the zircon mineral is the best immobilizing mineral for transuranic elements from among calcium-zirconate, aluma-calcium zirconate, and zircon.

TABLE 6A (Microprobe Analysis 3)
Quantitative Analysis
Thu Nov 09 15:12:16 2000
Sample A/S ceramics

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Zr—L | 0.5523 | 1.130 | 28.10 | 62.39 | +/−0.51 | $ZrO_2$ | 84.28 | 1.739 |
| Ca—K | 0.0557 | 1.075 | 6.14 | 5.99 | +/−0.19 | CaO | 8.38 | 0.380 |
| Th—M | 0.0432 | 1.495 | 1.14 | 6.45 | +/−0.58 | $ThO_2$ | 7.34 | 0.071 |
| O—K | — | 4.514 | 64.62 | 25.17 S | — | — | — | — |
| Total | | | 100.00 | 100.00 | | | 100.00 | 2.190 |
| Zr—L | 0.5819 | 1.124 | 28.79 | 65.39 | +/−0.53 | $ZrO_2$ | 88.32 | 1.782 |
| Ca—K | 0.0564 | 1.076 | 6.09 | 6.07 | +/−0.19 | CaO | 8.50 | 0.377 |
| Th—M | 0.0184 | 1.516 | 0.48 | 2.79 | +/−0.52 | $ThO_2$ | 3.18 | 0.030 |
| O—K | — | 4.578 | 64.64 | 25.75 S | — | — | — | — |
| Total | | | 100.00 | 100.00 | | | 100.00 | 2.188 |

The number of cation results are based upon 4 Oxygen atoms
Table Symbols: S -- Wt. % calculated by Stoichiometry

TABLE 6B (Microprobe Analysis 3)
Quantitative Analysis
Thu Nov 09 15:20:27 2000
Sample A/5 ceramics

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Na—K | 0.0074 | 2.127 | 1.86 | 1.57 | +/−0.07 | $Na_2O$ | 2.12 | 0.128 |
| Al—K | 0.1950 | 1.410 | 27.79 | 27.51 | +/−0.18 | $Al_2O_3$ | 51.98 | 1.903 |
| Si—K | 0.0026 | 1.494 | 0.38 | 0.39 | +/−0.06 | $SiO_2$ | 0.83 | 0.026 |
| Zr—L | 0.0314 | 1.447 | 1.36 | 4.54 | +/−0.17 | $ErO_2$ | 6.13 | 0.093 |
| Ag—L | 0.0087 | 1.281 | 0.28 | 1.12 | +/−0.81 | $Ag_2O$ | 1.20 | 0.019 |
| Ca—K | 0.1011 | 1.110 | 7.63 | 11.23 | +/−0.14 | CaO | 15.71 | 0.523 |
| Th—M | 0.1412 | 1.371 | 2.27 | 19.36 | +/−1.17 | $ThO_2$ | 22.03 | 0.156 |
| O—K | — | 3.290 | 58.42 | 34.28 S | — | — | — | — |
| Total | | | 100.00 | 100.00 | | | 100.00 | 2.847 |

The number of cation results are based upon 4 Oxygen atoms
Table Symbols: S -- Wt. % calculated by Stoichiometry

TABLE 6C (Microprobe Analysis 3)
Quantitative Analysis
Thu Nov 09 15:23:33 2000
Sample A/5 ceramics

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Na—K | 0.0011 | 2.520 | 0.81 | 0.27 | +/−0.08 | $Na_2O$ | 0.36 | 0.051 |
| Al—K | 0.0111 | 1.536 | 4.34 | 1.70 | +/−0.06 | $Al_2O_3$ | 3.22 | 0.272 |
| Si—K | 0.0013 | 1.254 | 0.39 | 0.16 | +/−0.05 | $SiO_2$ | 0.34 | 0.024 |
| Zr—L | 0.0503 | 1.207 | 4.57 | 6.07 | +/−0.17 | $ZrO_2$ | 8.20 | 0.287 |
| Ag—L | 0.0207 | 1.047 | 1.38 | 2.16 | +/−1.00 | $Ag_2O$ | 2.32 | 0.086 |
| Ca—K | 0.0171 | 1.034 | 3.04 | 1.77 | +/−0.09 | CaO | 2.48 | 0.190 |
| Th—M | 0.6512 | 1.121 | 21.63 | 73.01 | +/−1.68 | $ThO_2$ | 83.08 | 1.356 |
| O—K | — | 3.057 | 63.84 | 14.86 S | — | — | — | — |
| Total | | | 100.00 | 100.00 | | | 100.00 | 2.266 |
| Na—K | 0.0003 | 2.522 | 0.24 | 0.07 | +/−0.08 | $Na_2O$ | 0.09 | 0.015 |
| Al—K | 0.0003 | 1.534 | 0.15 | 0.05 | +/−0.05 | $Al_2O_3$ | 0.10 | 0.009 |
| Si—K | 0.0016 | 1.235 | 0.56 | 0.20 | +/−0.05 | $SiO_2$ | 0.43 | 0.035 |
| Zr—L | 0.0376 | 1.188 | 3.82 | 4.47 | +/−0.16 | $ZrO_2$ | 6.04 | 0.236 |
| Ag—L | 0.0268 | 1.020 | 1.97 | 2.73 | +/−1.02 | $Ag_2O$ | 2.93 | 0.122 |

TABLE 6C-continued (Microprobe Analysis 3)
Quantitative Analysis
Thu Nov 09 15:23:33 2000
Sample A/5 ceramics

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Ca—K | 0.0113 | 1.024 | 2.24 | 1.15 | +/−0.17 | CaO | 1.61 | 0.139 |
| Th—M | 0.7149 | 1.091 | 26.22 | 78.03 | +/−1.74 | ThO2 | 88.79 | 1.619 |
| O—K | — | 2.992 | 64.79 | 13.29 S | — | — | — | — |
| Total | | | 100.00 | 100.00 | | | 100.00 | 2.174 |

The number of cation results are based upon 4 Oxygen atoms
Table Symbols: S -- Wt. % calculated by Stoichiometry Example 6

Method for Immobilizing Solid Form Waste in Minerals with Addition of Additives (Integrating Waste with Immobilizing Minerals)

1. Mixing Simulation of Waste Composition with Simulation of Radionuclides (Found in the Waste) The mixing procedure of Example 5 was used.

2. Addition of Additives Ten percent by weight of $SiO_2$ was added.

3. Integrating Waste with Immobilizing Minerals Same as Example 5. This resulted in the complete crystallization of the mixture into several synthetic minerals. These minerals included primarily calcium zirconate, fluorite, and zircon. (See Example 5 in which no additive was added.) In addition, plagioclase was formed which also integrated some of the simulated radionuclides.

4. Microprobe Analysis Table 7 below (Microprobe Analysis 4) represents the result of another microprobe analysis of a crystal of an immobilizing mineral with solid waste integrated within by a solid state reaction. This analysis shows plagioclase, one of the several immobilizing minerals formed in this reaction, is a good immobilizing mineral for Sr.

TABLE 7

(Microprobe Analysis 4)
Quantitative Analysis
Tue Dec 05 13:15:08 2000
A8 crystal_2
PROZA Correction Acc. Volt. = 15 kV    Take-off Angle = 40.00 deg
Number of Iterations = 4

| Element | k-ratio | ZAF | Atom % | Element Wt % | Wt % Err. (1-Sigma) | Compound Formula | Compound Wt % | No. of Cations |
|---|---|---|---|---|---|---|---|---|
| Na—K | 0.0635 | 1.784 | 10.68 | 11.33 | +/−0.09 | Na2O | 15.27 | 4.461 |
| Al—K | 0.1487 | 1.402 | 16.75 | 20.85 | +/−0.09 | Al2O3 | 39.40 | 6.998 |
| Si—K | 0.1069 | 1.468 | 12.10 | 15.68 | +/−0.09 | SiO2 | 33.55 | 5.056 |
| Zr—L | 0.0000 | 1.632 | 0.00 | 0.00 | +/−0.00 | ZrO2 | 0.00 | 0.000 |
| Ca—K | 0.0377 | 1.138 | 2.32 | 4.30 | +/−0.06 | CaO | 6.01 | 0.971 |
| Ce—L | 0.0018 | 1.477 | 0.04 | 0.26 | −/−0.13 | Ce2O3 | 0.30 | 0.017 |
| La—L | 0.0000 | 1.486 | 0.00 | 0.00 | +/−0.00 | La2O3 | 0.00 | 0.000 |
| Cs—L | 0.0000 | 1.466 | 0.00 | 0.00 | +/−0.00 | Cs2O | 0.00 | 0.000 |
| Sr—L | 0.0086 | 1.582 | 0.34 | 1.37 | +/−0.21 | SrO | 1.62 | 0.141 |
| Th—M | 0.0000 | 1.489 | 0.00 | 0.00 | +/−0.00 | ThO2 | 0.00 | 0.000 |
| U—M | 0.0000 | 1.490 | 0.00 | 0.00 | +/−0.00 | UO2 | 0.00 | 0.000 |
| P—K | 0.0002 | 1.526 | 0.02 | 0.03 | +/−0.04 | P2O5 | 0.08 | 0.010 |
| F—K | 0.0006 | 4.038 | 0.29 | 0.25 | +/−0.14 | F | 0.25 | 0.121 |
| O—K | — | 2.360 | 57.45 | 42.41 S | — | — | — | — |
| Total | | | 100.00 | 96.48 | | | 96.48 | 17.775 |

The number of cation results are based upon 24 Oxygen atoms
Table Symbols: S - Wt.% calculated by Stoichiometry

Example 7

Method for Immobilizing Solid Form Waste in Mineral with Addition of Additives (Integrating Waste with Immobilizing Minerals)

Mixing simulation of waste composition with simulation of radionuclides (found in the waste) Same as Example 6 except that one weight % of each $ThO_2$, $UO_2$, $CeO_3$ and $La_2O_3$ were added to simulate a typical waste composition from Idaho Falls site in the State of Idaho in the United States.

2. Addition of Additives About fifteen percent by weight of $NaPO_3$ was added (simulating ten percent by weight of $P_2O_5$).

3. Integrating of Waste with Immobilizing Minerals Same as Example 5. This resulted in the complete crystallization of the mixture into several synthetic minerals. These minerals included primarily calcium zirconate, fluorite, and zircon. (See Example 5 in which no additive was added.) In addition, apatite was formed which also integrated some of the simulated radionuclides. (See Microprobe Analysis 4).

4. Microprobe Analysis Tables 8A and 8B below (Microprobe Analysis 5) represent the result of another microprobe analysis of a crystal of an immobilizing mineral with solid waste integrated within by a solid state reaction. This analysis involves apatite as one of the several immobilizing minerals formed in this reaction. The first analysis shown in Table 8A shows the composition of the mineral at its center. The second and third analyses shown in Table 8B show the composition of the mineral on the two sides. The concentration of $La_2O_3$ and $Ce_2O_3$ are relatively high, whereas the concentration of $ThO_2$ and $UO_2$ are relatively low. Apatite is a good immobilizing mineral for the first two oxides, while other minerals formed in this solid state reaction are better immobilizing minerals for the last two oxides.

TABLE 8A (Microprobe Analysis 5)
Quantitative Analysis
Note -- No user references for 15 kV are present in the my_stnds database.
Now performing analysis with standardless references.
Wed Jan 10 09:57:26 2001
PROZA Correction    Acc. Volt. = 15 kV    Take-off Angle = 40.00 deg
Number of Iterations = 4
mid crystal

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Si—K | 0.0049 | 1.223 | 0.52 | 0.60 | +/−0.07 | SiO2 | 1.29 | 0.219 |
| Zr—L | 0.0007 | 1.274 | 0.03 | 0.09 | +/−0.39 | ZrO2 | 0.13 | 0.010 |
| Th—M | 0.0028 | 1.362 | 0.04 | 0.38 | +/−0.17 | ThO2 | 0.43 | 0.017 |
| U—M | 0.0000 | 1.369 | 0.00 | 0.00 | +/−0.00 | UO2 | 0.00 | 0.000 |
| Ca—K | 0.3515 | 1.082 | 23.15 | 38.04 | +/−0.26 | CaO | 53.23 | 9.685 |
| Ce—L | 0.0078 | 1.495 | 0.20 | 1.16 | +/−0.21 | Ce2O3 | 1.36 | 0.084 |
| K—K | 0.0000 | 1.052 | 0.00 | 0.00 | +/−0.00 | K2O | 0.00 | 0.000 |
| Mg—K | 0.0000 | 1.665 | 0.00 | 0.00 | +/−0.00 | MgO | 0.00 | 0.000 |
| P—K | 0.1395 | 1.179 | 12.95 | 16.45 | +/−0.20 | P2O5 | 37.69 | 5.419 |
| F—K | 0.0082 | 5.189 | 5.49 | 4.28 | +/−0.42 | F | 4.28 | 2.299 |
| La—L | 0.0090 | 1.509 | 0.24 | 1.36 | +/−0.17 | La2O3 | 1.59 | 0.100 |
| O—K | — | 4.999 | 57.37 | 37.63 S | — | — | — | — |
| Total | | | 100.00 | 100.00 | | | 100.00 | 17.833 |

The number of cation results are based upon 24 Oxygen atoms
Table Symbols: S - Wt. % calculated by Stoichiometry

TABLE 8B (Microprobe Analysis 5)

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| Side 1 | | | | | | | | |
| Si—K | 0.0057 | 1.214 | 0.62 | 0.69 | +/−0.07 | SiO2 | 1.47 | 0.255 |
| Zr—L | 0.0138 | 1.264 | 0.48 | 1.74 | +/−0.42 | ZrO2 | 2.35 | 0.199 |
| Th—M | 0.0049 | 1.347 | 0.07 | 0.66 | +/−0.20 | ThO2 | 0.75 | 0.029 |
| U—M | 0.0029 | 1.359 | 0.04 | 0.40 | +/−0.26 | UO2 | 0.45 | 0.017 |
| Ca—K | 0.4040 | 1.076 | 27.60 | 43.47 | +/−0.32 | CaO | 60.83 | 11.302 |
| Ce—L | 0.0039 | 1.497 | 0.11 | 0.58 | +/−0.26 | Ce2O3 | 0.68 | 0.043 |
| K—K | 0.0000 | 1.037 | 0.00 | 0.00 | +/−0.00 | K2O | 0.00 | 0.000 |
| Mg—K | 0.0001 | 1.670 | 0.02 | 0.02 | +/−0.03 | MgO | 0.04 | 0.009 |
| P—K | 0.1168 | 1.170 | 11.22 | 13.67 | +/−0.20 | P2O5 | 31.31 | 4.597 |

TABLE 8B-continued (Microprobe Analysis 5)

| Element | k-ratio (calc.) | ZAF | Atom % | Element Wt % | Wt % Err. (1-Sigma) | Compound Formula | Compound Wt % | No. of Cations |
|---|---|---|---|---|---|---|---|---|
| F—K  | 0.0014 | 5.416 | 1.02  | 0.76    | +/−0.16 | F     | 0.76   | 0.418  |
| La—L | 0.0077 | 1.512 | 0.21  | 1.16    | +/−0.20 | La2O3 | 1.37   | 0.087  |
| O—K  | —      | 5.356 | 58.60 | 36.85 S | —       | —     | —      | —      |
| Total |       |       | 100.00 | 100.00 |         |       | 100.00 | 16.957 |
| Side 2 |      |       |        |        |         |       |        |        |
| Si—K | 0.0065 | 1.220 | 0.68  | 0.79    | +/−0.07 | SiO2  | 1.70   | 0.291  |
| Zr—L | 0.0022 | 1.274 | 0.07  | 0.28    | +/−0.38 | ZrO2  | 0.38   | 0.032  |
| Th—M | 0.0034 | 1.367 | 0.05  | 0.47    | +/−0.17 | ThO2  | 0.53   | 0.021  |
| U—M  | 0.0010 | 1.377 | 0.01  | 0.14    | +/−0.21 | UO2   | 0.15   | 0.006  |
| Ca—K | 0.3405 | 1.086 | 22.25 | 36.98   | +/−0.25 | CaO   | 51.74  | 9.504  |
| Ce—L | 0.0039 | 1.497 | 0.10  | 0.59    | +/−0.20 | Ce2O3 | 0.69   | 0.043  |
| K—K  | 0.0000 | 1.056 | 0.00  | 0.00    | +/−0.00 | K2O   | 0.00   | 0.000  |
| Mg—K | 0.0002 | 1.679 | 0.03  | 0.03    | +/−0.03 | MgO   | 0.05   | 0.013  |
| P—K  | 0.1387 | 1.179 | 12.74 | 16.37   | +/−0.20 | P2O5  | 37.50  | 5.443  |
| F—K  | 0.0118 | 5.135 | 7.71  | 6.07    | +/−0.47 | F     | 6.07   | 3.293  |
| La—L | 0.0067 | 1.511 | 0.18  | 1.02    | +/−0.15 | La2O3 | 1.19   | 0.075  |
| O—K  | —      | 4.975 | 56.18 | 37.28 S | —       | —     | —      | —      |
| Total |       |       | 100.00 | 100.00 |         |       | 100.00 | 18.720 |

Example 8

Method for Immobilizing Liquid Form Waste in Natural Minerals together with Solid Form Waste in Rock 1. Activation A natural calcium-zeolite was crushed and heated to about 400° C. for about 12 hours to remove volatile components.

2. Absorption

Both cerium chloride and thorium nitrate were dissolved in water resulting in an aqueous solution containing cerium and thorium. This solution was then stirred with the calcium-zeolite at room temperature. The Calcium-zeolite was then washed in alcohol at room temperature and then dried at 110° C. for about two hours.

3. Transformation+Overgrowth+Rock Matrix (All in One Step) Thirty weight % of the calcium-zeolite was mixed with 40 weight % of various compounds (simulating a typical waste composition), including the following: 10 weight percent $SiO_2$, 10 weight percent $ZrO_2$, 10 weight percent $Mn(NO_3)_2$, and 10 weight percent $SnSO_4$. The particle size of these four compounds was 200–300 microns. To this was added 30 weight % of tuff. The result was heated until melted for about two hours at 1200° C. and cooled by gradual decrease of temperature for 48 hours until reaching 600° C. This was then cooled to 25° C. The resulting product was a dense glass incorporating all of the above compounds. This resulted in the calcium-zeolite (a) being transformed into plagioclase containing cesium and thorium since tuff contains the components of plagioclase, (b) covered with a non-radioactive layer of plagioclase, and (c) all of this covered in a tuff matrix. The waste oxide loading we attained was approximately 60 weight %. This was calculated in the following manner:

1) 40 weight % waste compounds.
2) 30 weight % zeolite in which approximately 70 weight % radionuclides was incorporated (30%×0.7= approximately 20 weight %).

The results of Microprobe Analyses 1 through 5 discussed above demonstrate that in liquid waste tests, the present invention can integrate 95–100% of the waste oxides from the liquid waste into the crystal structure of the final product. In solid waste tests, the present invention can integrate 100% of the waste oxides from the solid waste into the crystal structure of the final product.

The present invention has numerous embodiments and applications. Each of the embodiments comprises one or more of the steps described above.

In addition, each of the embodiments can comprise other steps known to one of ordinary skill in the art to implement the various embodiments. The steps may be implemented in any logical order, i.e., the order is not limited to the order in which the steps are described above or recited in the claims below.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A process for immobilizing wastes comprising:
   integrating a waste having one or more of radionuclides, hazardous elements, and hazardous compounds with an immobilizing mineral to produce a waste integrated mineral;
   encapsulating the waste integrated mineral in a surrounding matrix to form a waste product, wherein the surrounding matrix has at least one component in common with components of the immobilizing mineral and the surrounding matrix includes an additional amount of the waste.

2. The process of claim 1, further comprising creating an effective covering of the waste integrated mineral before or during the encapsulating step.

3. The process of claim 1, further comprising burying the waste product within an indigenous rock, wherein the indigenous rock and the surrounding matrix comprise at least one common component.

4. The process of claim 1, wherein the integrating step involves contacting the immobilizing mineral with a solution containing the waste.

5. The process of claim 1, wherein the integrating step involves mixing components of the immobilizing mineral with the waste at an elevated temperature.

6. The process of claim 1, wherein the integrating step involves heating the waste, which contains components of the immobilizing mineral at an elevated temperature.

7. The process of claim 2, wherein the effective covering is produced by an overgrowth procedure, wherein the effective covering is at least two microns.

8. The process of claim 1, wherein the surrounding matrix comprises a rock.

9. The process of claim 1, wherein the surrounding matrix comprises a glass.

10. The process of claim 2, wherein the effective covering is created using an overgrowth procedure.

11. The process of claim 10, wherein the effective covering is between about 2 microns and about 30 microns.

12. The process of claim 1, wherein the immobilizing mineral is a rock forming mineral.

13. The process of claim 1, wherein the immobilizing mineral has all of its components in common with components of the surrounding matrix.

14. The process of claim 1, wherein there is thermodynamic equilibrium between the waste integrated mineral and the surrounding matrix.

15. The process of claim 1, wherein the immobilizing mineral is a natural rock forming mineral.

16. The process of claim 1, wherein the immobilizing mineral is selected from the group consisting of phosphates, silicates, oxide, and clays.

17. The process of claim 1, wherein the immobilizing mineral is selected from the group consisting of loparite, apatite, sphen, sodalite, nepheline, thorite, zircon, and monazite.

18. The process of claim 1, wherein the immobilizing mineral is a feldspar.

19. The process of claim 1, wherein the immobilizing mineral is a plagioclase.

20. The process of claim 1, wherein the immobilizing mineral is a zeolite.

21. The process of claim 1, further comprising burying the waste product within an indigenous rock, wherein the immobilizing mineral has all of its components in common with components of the indigenous rock.

22. The process of claim 1, further comprising burying the waste product within an indigenous rock, wherein there is thermodynamic equilibrium between the surrounding matrix and the indigenous rock.

23. An encapsulated waste product comprising:
a waste integrated mineral comprising an immobilizing mineral and a waste comprising one or more of radionuclides, hazardous elements, and hazardous compounds; and
a surrounding matrix which surrounds the waste integrated mineral, wherein the surrounding matrix comprises at least one component that is in common with components of the immobilizing mineral and an additional amount of the waste.

24. The waste product of claim 23, wherein the surrounding matrix comprises at least one component that is in common with an indigenous rock of a disposal site.

25. The waste product of claim 23, wherein the immobilizing mineral is selected from the group consisting of phosphates, silicates, oxide, and clays.

26. The waste product of claim 23, wherein the waste comprises a member selected from the group consisting of Fe, Na, P, Cr, Al, Mn, Ni, Na, Zr, K, Cs, Ru, Sr, Ba, Tc, Rh, Mg, I, actinides lanthanides, other components of radioactive waste, and other components of hazardous waste.

27. The waste product of claim 23, wherein the immobilizing mineral is selected from the group consisting of loparite, apatite, sphen, feldspar, plagioclase, sodalite, nepheline, thorite, zircon, monazite, and zeolite.

28. The waste product of claim 23, wherein the one or more of radionuclides, hazardous elements, and hazardous compounds replace elements in the crystal lattice of the immobilizing mineral.

29. The waste product of claim 23, further comprising an effective covering between the waste integrated mineral and the surrounding matrix.

30. The waste product of claim 29, wherein the effective covering is produced by an overgrowth procedure, wherein the effective covering is at least two microns.

31. The waste product of claim 29, wherein the effective covering includes an amount of radionuclides, hazardous elements, and hazardous compounds that is smaller than the amount of radionuclides, hazardous elements, and hazardous compounds found in the waste integrated mineral.

32. The waste product of claim 23, wherein the surrounding matrix comprises a rock.

33. The waste product of claim 23, wherein the surrounding matrix comprises a glass.

34. The waste product of claim 29, wherein the effective covering is created using an overgrowth procedure.

35. The waste product of claim 34, wherein the effective covering is between about 2 microns and about 30 microns.

36. A process for immobilizing solid waste comprising:
heating a solid waste containing components of an immobilizing mineral at an elevated temperature to create a waste integrated mineral; and
encapsulating the waste integrated mineral with one or both of an effective covering and a surrounding matrix,
wherein the surrounding matrix includes an additional amount of the waste and at least one component that is in common with components of the immobilizing mineral.

37. The process of claim 36, further comprising mixing components of the immobilizing mineral before or during the heating step.

38. The process of claim 36, wherein the surrounding matrix comprises a rock.

39. The process of claim 36, wherein the surrounding matrix comprises a glass.

40. The process of claim 36, wherein the effective covering is created using an overgrowth procedure.

41. The process of claim 40, wherein the effective covering is thicker than two microns.

42. The process of claim 40, wherein the effective covering is between about 2 microns and about 30 microns.

43. The process of claim 36, wherein the effective covering is created using a sintering process.

44. A process for immobilizing wastes comprising:
integrating a waste having one or more of radionuclides, hazardous elements, and hazardous compounds with an immobilizing mineral to produce a waste integrated mineral;
mixing the waste integrated mineral with flux and additional components of the immobilizing mineral;
hearing the waste integrated mineral, flux, and the additional components of the immobilizing mineral to an elevated temperature: and producing an effective covering of the waste integrated mineral, wherein the effective covering is thicker than two microns.

45. The process of claim 44, wherein the flux is $Na_2B_4O_7 \cdot 10H_2O$.

46. The process of claim 44, wherein the flux is $CaF_2$.

47. The process of claim 44, wherein the flux includes a mixture of flux and crushed rock.

48. The process of claim 44, wherein the effective covering is between about 2 microns and about 30 microns.

* * * * *